US011183750B2

(12) United States Patent
Kodama et al.

(10) Patent No.: US 11,183,750 B2
(45) Date of Patent: Nov. 23, 2021

(54) VEHICULAR ANTENNA, VEHICULAR ANTENNA-ATTACHED WINDOW GLASS, AND ANTENNA SYSTEM

(71) Applicant: AGC Inc., Tokyo (JP)

(72) Inventors: Kenichiro Kodama, Tokyo (JP); Koki Mikamo, Tokyo (JP); Fuminori Watanabe, Tokyo (JP); Shoichi Takeuchi, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 17/073,917

(22) Filed: Oct. 19, 2020

(65) Prior Publication Data

US 2021/0036412 A1 Feb. 4, 2021

Related U.S. Application Data

(63) Continuation of application No. PCT/JP2019/016900, filed on Apr. 19, 2019.

(30) Foreign Application Priority Data

Apr. 24, 2018 (JP) .............................. JP2018-083263

(51) Int. Cl.
*H01Q 1/32* (2006.01)

(52) U.S. Cl.
CPC ......... *H01Q 1/3233* (2013.01); *H01Q 1/3291* (2013.01)

(58) Field of Classification Search
CPC .......... H01Q 1/1271; H01Q 1/27; H01Q 1/32; H01Q 1/3233; H01Q 1/3291; H01Q 19/005; H01Q 9/04; H01Q 9/0407
See application file for complete search history.

(56) References Cited

U.S. PATENT DOCUMENTS 6,396,446 B1 * 5/2002 Walstra ................. B60C 23/061
343/700 MS
7,652,623 B2 * 1/2010 Oomuro ................. H01Q 21/22
342/360

(Continued)

FOREIGN PATENT DOCUMENTS

JP H06-44216 6/1994
JP H06-082977 B2 10/1994

(Continued)

OTHER PUBLICATIONS

Imran et al., "Beam-switching Planar Parasitic Antenna Array," 2014 Loughborough Antennas and Propagation Conference (LAPC), Nov. 10-11, 2014, UK, 5 pages.

(Continued)

*Primary Examiner* — Jason Crawford
(74) *Attorney, Agent, or Firm* — Foley & Lardner LLP

(57) ABSTRACT

A vehicle antenna includes a conductor plate, a radiator plate facing the conductor plate, a feeding portion located on a same side as the conductor plate with respect to the radiator plate, a connection conductor connecting the feeding portion and the radiator plate, and a first element and a second element arranged away from each other on both sides in a vehicle-width direction of a vehicle with respect to the radiator plate, wherein the radiator plate is arranged at an inclination of equal to or less than ±15 degrees with respect to a vertical plane perpendicular to a horizontal plane.

43 Claims, 19 Drawing Sheets

(56) References Cited

U.S. PATENT DOCUMENTS

| | | | | |
|---|---|---|---|---|
| 10,476,149 B1* | 11/2019 | Ueda | ................ | H01Q 5/385 |
| 2004/0203390 A1* | 10/2004 | Inoue | ................ | H01Q 1/325 |
| | | | | 455/41.2 |
| 2008/0088510 A1* | 4/2008 | Murata | ............ | H01Q 19/28 |
| | | | | 343/700 MS |
| 2008/0129636 A1* | 6/2008 | Surittikul | ......... | H01Q 1/1271 |
| | | | | 343/858 |
| 2008/0180332 A1 | 7/2008 | Noro et al. | | |
| 2011/0193761 A1 | 8/2011 | Shinkai et al. | | |
| 2012/0154229 A1* | 6/2012 | Kagaya | ............ | H01Q 13/10 |
| | | | | 343/713 |
| 2013/0257664 A1* | 10/2013 | Kagaya | ............ | H01Q 13/10 |
| | | | | 343/713 |
| 2014/0266957 A1* | 9/2014 | Inoue | ............... | H01Q 19/005 |
| | | | | 343/843 |
| 2015/0123838 A1* | 5/2015 | Shi | ................ | H01Q 21/0075 |
| | | | | 342/70 |
| 2016/0344088 A1* | 11/2016 | Takeuchi | ............ | H01Q 1/48 |
| 2017/0069950 A1 | 3/2017 | Kim et al. | | |
| 2017/0077595 A1* | 3/2017 | Nakano | ............ | H01Q 1/1271 |
| 2017/0331171 A1* | 11/2017 | Takahashi | ......... | H01Q 13/106 |
| 2019/0229409 A1 | 7/2019 | Hashimoto et al. | | |
| 2019/0273310 A1 | 9/2019 | Sone | | |
| 2020/0127381 A1 | 4/2020 | Sone | | |
| 2020/0295444 A1 | 9/2020 | Sampo | | |
| 2021/0091480 A1 | 3/2021 | Sampo | | |

FOREIGN PATENT DOCUMENTS

| | | |
|---|---|---|
| JP | H07-3928 B2 | 1/1995 |
| JP | 2003-124719 A | 4/2003 |
| JP | 2008-109252 A | 5/2008 |
| JP | 2015-092658 A | 5/2015 |
| JP | 2017-139686 A | 8/2017 |
| WO | WO-2017/213243 A1 | 12/2017 |

OTHER PUBLICATIONS

Nishizawa et al., "Broad Beamwidth and Cross Polarization Free Dipole Antennas With Reactive Loaded Monopoles," IEEE Transactions on Antennas and Propagation, vol. 55, No. 5, May 2007, pp. 1230-1238.

International Searching Authority, "International Search Report," issued in connection with International Patent Application No. PCT/JP2019/016900, dated Jun. 18, 2019.

International Searching Authority, "Written Opinion," issued in connection with International Patent Application No. PCT/JP2019/016900, dated Jun. 18, 2019.

\* cited by examiner

VEHICULAR ANTENNA, VEHICULAR ANTENNA-ATTACHED WINDOW GLASS, AND ANTENNA SYSTEM

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2019/016900 filed on Apr. 19, 2019 and designating the U.S., which claims priority to Japanese Patent Application No. 2018-083263 filed on Apr. 24, 2018. The entire contents of the foregoing applications are incorporated herein by reference.

BACKGROUND OF THE INVENTION

1. Field of the Invention

The present invention relates to a vehicle antenna, a vehicle antenna-attached window glass, and an antenna system.

2. Description of the Related Art

In recent years, there is an ongoing trend of, for example, a transition from 4G LTE to 5G (sub6) to expand services using high-speed and large-capacity wireless communication systems communicating in microwave and millimeter wave frequency bands. For example, for V2X (Vehicle to Everything) communication such as vehicle-to-vehicle communication and road-to-vehicle communication, an antenna device that supplies power to two or more dipole antennas provided on a substrate via parallel 2-wire transmission lines provided on the substrate is known as an antenna used for such communication (for example, see PTL 1).

CITATION LIST

Patent Literature

PTL 1: International Publication No. 2017/213243

SUMMARY OF THE INVENTION

Technical Problem

However, with conventional vehicle antennas, it used to be difficult to obtain a sufficient antenna gain in a desired direction.

Therefore, the present disclosure provides a vehicle antenna with an improved antenna gain in a desired direction, and provides vehicle antenna-attached window glass including at least one such vehicle antenna, and an antenna system.

Solution to Problem

The present disclosure provides a vehicle antenna including:
 a conductor plate;
 a radiator plate facing the conductor plate;
 a feeding portion located on a same side as the conductor plate with respect to the radiator plate;
 a connection conductor connecting the feeding portion and the radiator plate; and
 a first element and a second element arranged away from each other on both sides in a vehicle-width direction of a vehicle with respect to the radiator plate,
 wherein the radiator plate is arranged at an inclination of equal to or less than ±15 degrees with respect to a vertical plane perpendicular to a horizontal plane.

Also, the present disclosure provides a vehicle antenna including:
 a conductor plate;
 a radiator plate facing the conductor plate;
 a feeding portion located on a same side as the conductor plate with respect to the radiator plate;
 a connection conductor connecting the feeding portion and the radiator plate; and
 a single element arranged away from the conductor plate and the radiator plate, and located away from a center of gravity of the radiator plate, as viewed from a same side as the radiator plate with respect to the conductor plate,
 wherein the radiator plate is arranged with an inclination of equal to or less than ±15 degrees with respect to a vertical plane perpendicular to a horizontal plane.

Also, the present disclosure provides a vehicle antenna-attached window glass including at least one such vehicle antenna and an antenna system.

Advantageous Effects of Invention

According to the present disclosure, the antenna gain in the desired direction is improved.

DETAILED DESCRIPTION OF THE PREFERRED EMBODIMENTS

Hereinafter, an embodiment according to the present disclosure is described with reference to drawings. In each embodiment, deviations from directions such as parallel direction, perpendicular direction, orthogonal direction, horizontal direction, vertical direction, height direction, width direction, and the like are tolerated so long as the effects of the present invention are not impaired. Further, an X axis direction, a Y axis direction, and a Z axis direction represent a direction parallel to the X axis, a direction parallel to the Y axis, and a direction parallel to the Z axis, respectively. The X axis direction, the Y axis direction, and the Z axis direction are orthogonal to each other. The XY plane, the YZ plane, and the ZX plane are a virtual plane parallel to the X axis direction and the Y axis direction, a virtual plane parallel to the Y axis direction and the Z axis direction, and a virtual plane parallel to the Z axis direction and the X axis direction, respectively.

A vehicle antenna of an embodiment according to the present disclosure is suitable for transmitting and receiving electromagnetic waves in electromagnetic frequency bands such as microwave and millimeter wave bands (for example, 0.3 GHz to 300 GHz; more particularly, 5.9 GHz). The vehicle antenna of the embodiment according to the present disclosure can be applied to, for example, a V2X communication system, a fifth generation mobile communication system (i.e., 5G), a radar system on vehicle, and the like, but the applicable systems are not limited thereto. An example of V2X communication system includes an ETC (Electronic Toll Collection) system.

Figure 1:
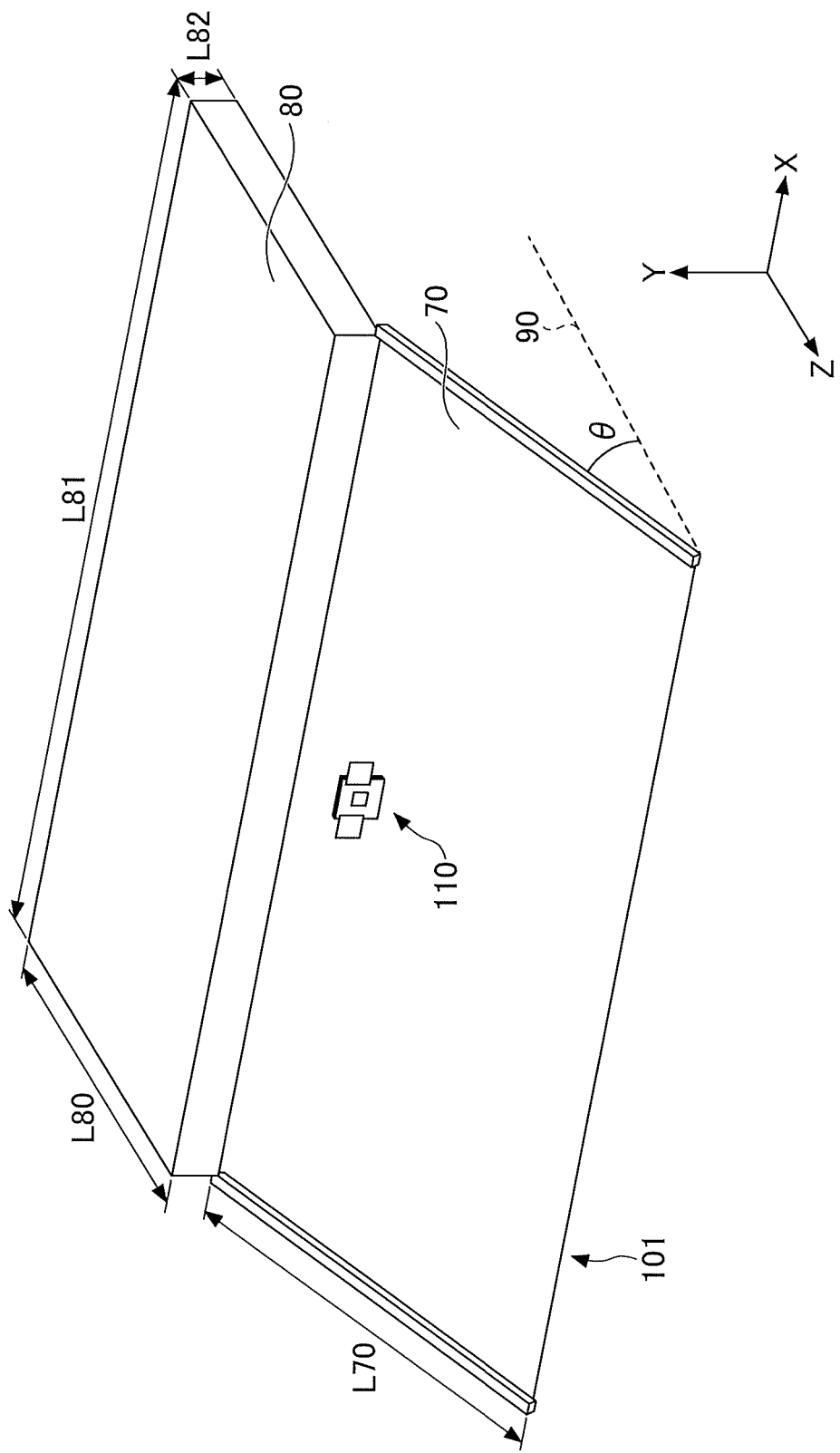
FIG. 1 is a perspective view illustrating an example of vehicle antenna-attached window glass.

FIG. 1 is a perspective view illustrating an example of vehicle antenna-attached window glass 101 (which may be hereinafter simply referred to as "window glass 101") according to the embodiment of the present disclosure. The window glass 101 includes a glass plate 70 as window of a vehicle 80 and a vehicle antenna 110 (which may be hereinafter simply referred to as "antenna 110") attached to the glass plate 70.

The glass plate 70 is, for example, a windshield provided on a front side of the vehicle 80. The glass plate 70 is attached to a front window frame of the vehicle 80 at a predetermined installation angle θ with respect to the horizontal plane 90. In this example, the horizontal plane 90 is parallel to a ZX plane.

The antenna 110 is attached to the inside of the glass plate 70 with a member, not illustrated, such as a housing, and in this example, the antenna 110 is attached around the central portion of the upper side area of the glass plate 70. In this example, the number of antennas 110 attached to one glass plate 70 is one, but two or more antennas 110 may be attached to one glass plate 70.

Figure 2:
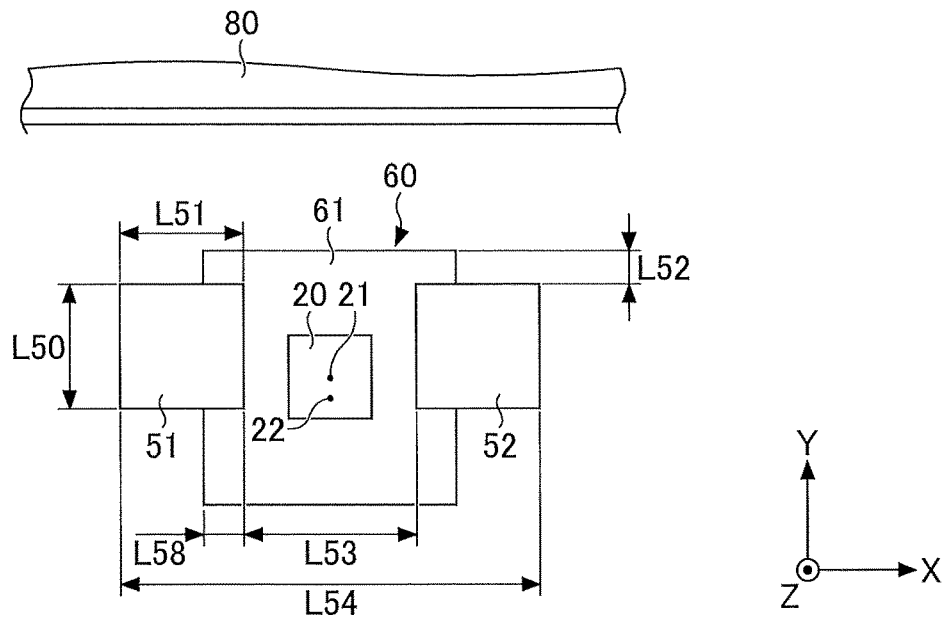
FIG. 2 is a partially enlarged view illustrating, in a front view, an example of vehicle antenna-attached window glass.
Figure 3:
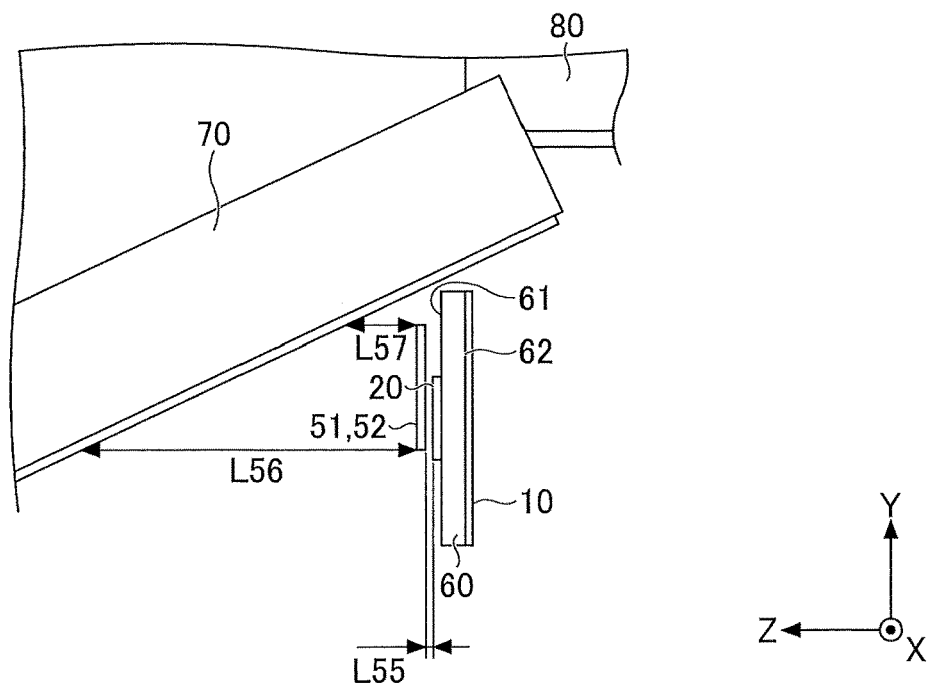
FIG. 3 is a partially enlarged view illustrating, in a side view, an example of vehicle antenna-attached window glass.

FIG. 2 is a partially enlarged view illustrating, in a front view, an example of the window glass 101. FIG. 3 is a partially enlarged view illustrating, in a side view, an example of the window glass 101. The antenna 110 includes a conductor plate 10, a radiator plate 20, a first element 51, and a second element 52.

Typically, the conductor plate 10 is a planar layer of which the surface is parallel to the XY plane, and functions as a ground for the antenna 110. The conductor plate 10 is a plate-shaped or film-shaped conductor. Examples of materials of conductors used for the conductor plate 10 include silver and copper, but the materials are not limited thereto. Although the conductor plate 10 illustrated in the drawing is square, the conductor plate 10 may have a polygonal shape other than a square, or may have another shape such as a circle. Note that the term "plate-shaped or film-shaped" as used herein may include shapes having three-dimensional shapes such as, for example, convex, concave, and wavy shapes. This is also applicable to radiator plates, dielectric base materials, first and second elements, and a single element explained later. However, the "plate-shaped or film-shaped" explained later is preferably a planar shape (two-dimensional shape) because predetermined antenna gain characteristics can be readily predicted.

The radiator plate 20 is a plate-shaped or film-shaped conductor arranged to face the conductor plate 10 in the Z axis direction. The area of the radiator plate 20 is smaller than the area of the conductor plate 10. The radiator plate 20 is a planar layer of which the surface is parallel to the XY plane, and functions as a radiating element for the antenna 110. Examples of materials of conductors used for the radiator plate 20 include silver, copper, and the like, but the materials are not limited thereto. Although the radiator plate 20 illustrated in the drawing has a square shape, the radiator plate 20 may have a polygonal shape other than the square shape, or may have another shape such as a circle.

The radiator plate 20 is spaced apart from the conductor plate 10. The medium between the conductor plate 10 and the radiator plate 20 contains at least one of a space and a dielectric base material. FIGS. 2 and 3 illustrate the case where the medium is constituted by only the dielectric base material 60. In a case where the medium is a space (air), the radiator plate 20, the conductor plate 10, the first element 51, and the second element 52 (or a single element serving as any one of the first element 51 and the second element 52) may be fixed by a housing, not illustrated, as necessary.

The dielectric base material 60 is a plate-shaped or film-shaped dielectric layer of which the main component is dielectric. The dielectric base material 60 includes a first surface 61 and a second surface 62 on the opposite side of the first surface 61. The surfaces 61, 62 are parallel to the XY plane. The surface 61, which is one of the surfaces of the dielectric base material 60, is provided with the radiator plate 20. The surface 62, which is the other of the surfaces of the dielectric base material 60, is provided with the conductor plate 10.

For example, the dielectric base material 60 may be a dielectric substrate such as a glass epoxy substrate, or may be a dielectric sheet. Examples of materials of dielectric used for the dielectric base material 60 include glass such as quartz glass, ceramics, fluorine resin such as polytetrafluoroethylene, liquid crystal polymer, cycloolefin polymer, and the like, but the materials are not limited thereto.

Figure 4:
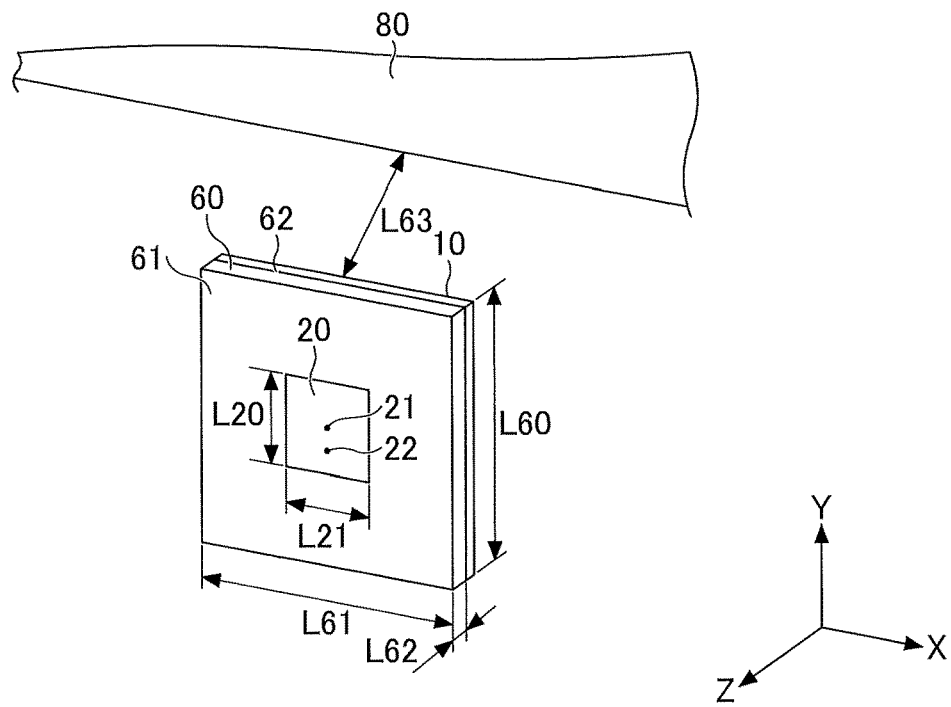
FIG. 4 is a perspective view illustrating an example of a portion of a configuration of a vehicle antenna.
Figure 5:
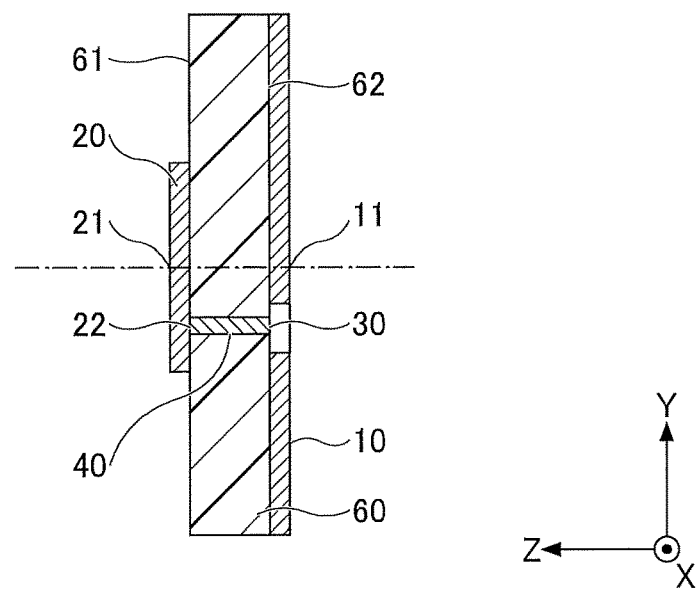
FIG. 5 is a cross sectional view illustrating an example of a portion of a configuration of a vehicle antenna.

FIG. 4 is a perspective view illustrating the dielectric base material 60 formed with the conductor plate 10 and the radiator plate 20. FIG. 5 is a cross sectional view illustrating the dielectric base material 60 formed with the conductor plate 10 and the radiator plate 20. The dielectric base material 60 includes a connection conductor 40 connecting a feeding portion 30 and the radiator plate 20.

The feeding portion 30 is a portion to which electric power is supplied with a contact or contactless connection, and is a portion to which one end of a feeding line, not illustrated, is connected or arranged in proximity. Specific examples of feeding lines include coaxial cables and microstrip lines. The other end of the feeding line is connected to a communication device that communicates with the outside of the vehicle using the antenna 110. The feeding portion 30 is located on a same side as the conductor plate 10 with respect to the radiator plate 20.

The connection conductor 40 is not in contact with the conductor plate 10. One end of the connection conductor 40 is connected to the feeding portion 30. The other end of the connection conductor 40 is connected, at a connection point 22, to the radiator plate 20. The connection point 22 is displaced from the center of gravity 21 of the radiator plate 20. In the illustrated case, the connection point 22 is located on the negative side in the Y axis direction with respect to the center of gravity 21. In a case where the radiator plate 20 is a symmetric figure such as a square, the center of gravity 21 corresponds to the center of the symmetric figure.

Specific examples of the connection conductor 40 include a conductor formed in a through hole penetrating through the dielectric base material 60 in the Z axis direction, the center core of a coaxial cable, a conductor pin formed in a pin shape, and the like, but the connection conductor 40 is not limited thereto. In a case where the medium between the conductor plate 10 and the radiator plate includes space, specific examples of the connection conductor 40 include the center core of a coaxial cable, a conductor pin, and the like, but the connection conductor 40 is not limited thereto.

As illustrated in FIG. 5, in terms of improving the antenna gain of the antenna 110 in a direction from the conductor plate 10 to the radiator plate 20, the center of gravity 21 of the radiator plate 20 preferably overlaps the center of gravity 11 of the conductor plate 10 as viewed from the same side as the radiator plate 20 with respect to the conductor plate 10. In this example, "the viewpoint on the same side as the radiator plate 20 with respect to the conductor plate 10" represents a viewpoint on the positive side in the Z axis direction, and "the direction from the conductor plate 10 to the radiator plate 20" represents a direction toward the positive side in the Z axis direction.

In FIG. 2, the first element 51 and the second element 52 are conductors arranged away from each other on both sides in the vehicle-width direction (in the illustrated case, the X axis direction being the vehicle-width direction) with respect to the radiator plate 20. Because the first element 51 and the second element 52 are arranged in this manner, the antenna gain of the antenna 110 in the vehicle-width direction is improved. Specifically, in a case where the first element 51 and the second element 52 are not provided, the antenna gain in the traveling direction (of the vehicle) perpendicular to the vehicle-width direction would be high, whereas the antenna gain in the vehicle-width direction would be relatively low. Therefore, the first element 51 and the second element 52 are provided, so that the antenna gain in the traveling direction is moderately distributed to the antenna gain in the vehicle-width direction to provide appropriate antenna gains in both of the traveling direction and the vehicle-width direction. In this case, where "the antenna gain in the traveling direction [dBi]−(−35 [dBi])" is defined as A [dBi], and "the antenna gain in the vehicle-width direction [dBi]−(−35 [dBi])" is defined as B [dBi], A:B may be in a range of 1:0.55 to 1:1.50, A:B is preferably in a range of 1:0.65 to 1:1.40, A:B is more preferably in a range of 1:0.70 to 1:1.30, and A:B is still more preferably in a range of 1:0.80 to 1:1.20. In this case, the antenna gain in the vehicle-width direction is an average value of the antenna gain in the direction of 90 degrees and the antenna gain in the direction of 270 degrees in a simulation result of the antenna gain in the azimuth directions on the ZX plane.

For example, at least one of the first element 51 and the second element 52 is a planar layer of which the surface is parallel to the XY plane, and functions as a directing element or a reflecting element for the antenna 110. In this example, the first element 51 and the second element 52 are the same layer as each other, i.e., the surface of the first element 51 and the surface of the second element 52 are arranged in parallel to the XY plane, and are located away from the center of gravity 21 of the radiator plate 20 as viewed from the same side as the radiator plate 20 with respect to the conductor plate 10.

In this example, the size of area of each of the first element 51 and the second element 52 is smaller than the conductor plate 10 and is larger than the radiator plate 20, but the size of area is not limited thereto. For example, the size of area of at least one of the first element 51 and the second element 52 may be smaller than the radiator plate 20, as long as a desired directivity is satisfied.

Examples of materials of conductors used for the first element 51 and the second element 52 include silver, copper, and the like, but the materials are not limited thereto. Also, although the first element 51 and the second element 52 illustrated in the drawing have a square shape, the first element 51 and the second element 52 may have a polygonal shape other than the square shape, or may have another shape such as a circle.

When at least one of the first element 51 and the second element 52 is a plate-shaped or film-shaped conductor having its normal in the Z axis direction, the antenna gain of the antenna 110 in the positive side in the Z axis direction is improved. In the illustrated case, both of the first element 51 and the second element 52 are plate-shaped or film-shaped conductors.

In terms of improving the antenna gain in the direction normal to the first element 51, the second element 52, the conductor plate 10, and the radiator plate 20 of the antenna 110, the first element 51, the second element 52, the conductor plate 10, and the radiator plate 20 are preferably parallel to each other. In the illustrated case, the direction normal to the first element 51, the second element 52, the conductor plate 10, and the radiator plate 20 is the Z axis direction, and the antenna gain toward the positive side in the Z axis direction is improved.

For example, when, as illustrated in FIG. 2, in terms of improving the antenna gain of the antenna 110, the first element 51 and the second element 52 are preferably placed in a linearly symmetrical arrangement about axis of symmetry passing through the connection point 22, where the connection conductor 40 is connected to the radiator plate 20 as viewed from the same side as the radiator plate 20 with respect to the conductor plate 10. In this example, the antenna gain in the X axis direction, which is the vehicle-width direction, is improved.

Figure 6:
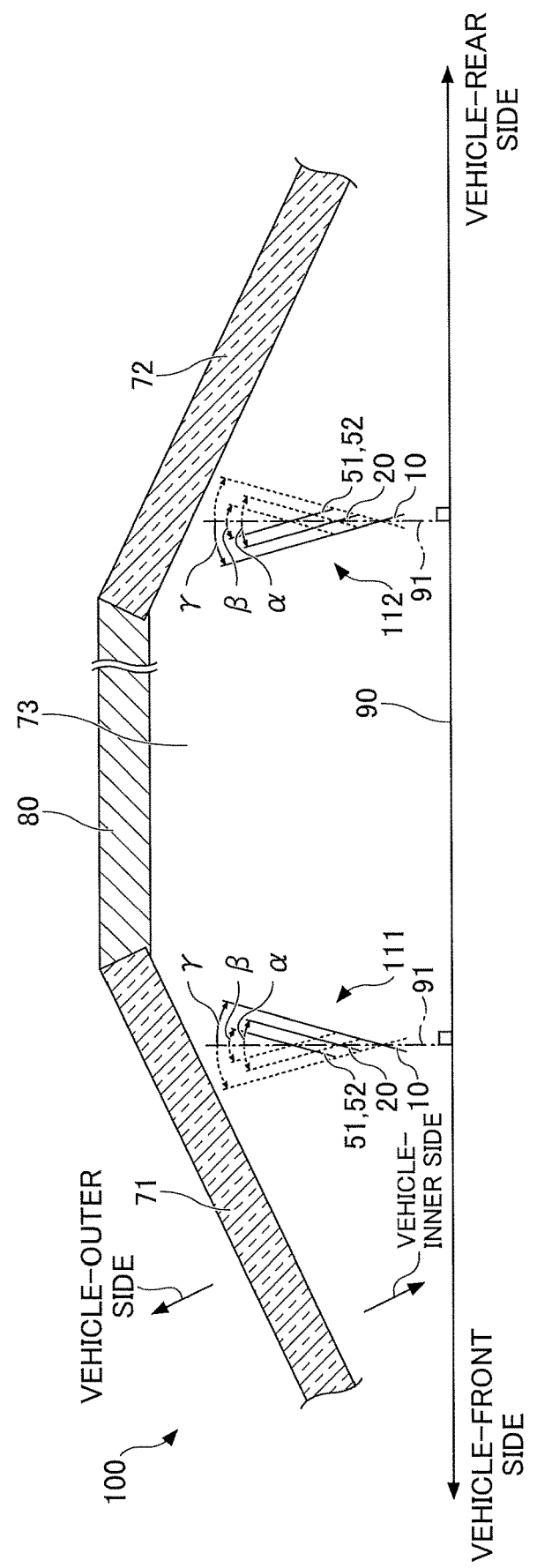
FIG. 6 is a drawing illustrating an example of an antenna system having multiple vehicle antennas.

FIG. 6 is a partial cross sectional view illustrating an example of an antenna system including multiple vehicle antennas. The antenna system 100 as illustrated in FIG. 6 includes a windshield 71, a rear window glass 72, a front antenna 111 attached to the windshield 71, and a rear antenna 112 attached to the rear window glass 72. Each of the windshield 71 and the rear window glass 72 is an example of the glass plate 70 explained above. Each of the front antenna 111 and the rear antenna 112 is an example of the antenna 110 explained above. The front antenna 111 is an example of a first antenna. The rear antenna 112 is an example of a second antenna.

The radiator plate 20 of the front antenna 111 is preferably arranged at an inclination (inclination angle α) equal to or less than ±15 degrees with respect to the vertical plane 91 perpendicular to the horizontal plane 90. Accordingly, the antenna gain in the direction parallel to the horizontal plane 90 is improved in the front antenna 111, and because the first element 51 and the second element 52 are arranged away from each other on both sides in the vehicle-width direction, the antenna gain in the vehicle-width direction is also improved. If the radiator plate 20 of the front antenna 111 is arranged at an inclination more than ±15 degrees with respect to the vertical plane 91 perpendicular to the horizontal plane 90, the balance of the antenna gain in a direction parallel to the horizontal plane is lost, i.e., the difference between the gain in the traveling direction of the vehicle and the gain in the vehicle-width direction may increase.

Likewise, the radiator plate 20 of the rear antenna 112 is preferably arranged at an inclination (inclination angle α) equal to or less than ±15 degrees with respect to the vertical plane 91 perpendicular to the horizontal plane 90. Accordingly, the antenna gain in the direction parallel to the horizontal plane 90 is improved in the rear antenna 112, and because the first element 51 and the second element 52 are arranged away from each other on both sides in the vehicle-width direction, the antenna gain in the vehicle-width direction is improved. If the radiator plate 20 of the rear antenna 112 is arranged at an inclination more than ±15 degrees with respect to the vertical plane 91 perpendicular to the horizontal plane 90, the balance of the antenna gain in a direction parallel to the horizontal plane is lost, i.e., the difference between the gain in the traveling direction of the vehicle and the gain in the vehicle-width direction may increase.

The radiator plate 20 of the front antenna 111 is preferably arranged at an inclination equal to or less than ±10 degrees, more preferably arranged at an inclination equal to or less than ±5 degrees, still more preferably arranged at an inclination equal to or less than ±1 degrees, and most preferably arranged at an inclination of 0 degrees, with respect to the vertical plane 91 perpendicular to the horizontal plane 90. Likewise, the radiator plate 20 of the rear antenna 112 is preferably arranged at an inclination equal to or less than ±10 degrees, more preferably arranged at an inclination equal to or less than ±5 degrees, still more preferably arranged at an inclination equal to or less than ±1 degrees, and most preferably arranged at an inclination of 0 degrees, with respect to the vertical plane 91 perpendicular to the horizontal plane 90.

In FIG. 6, the front antenna 111 is attached to the windshield 71 so that the radiator plate 20 is located at a vehicle-front-side with respect to the conductor plate 10, and the rear antenna 112 is attached to the rear window glass 72 so that the radiator plate 20 is located at a vehicle-rear-side with respect to the conductor plate 10. Therefore, the front antenna 111 improves the antenna gain in an area ranging from the front side of the vehicle to the vehicle-width direction, and the rear antenna 112 improves the antenna gain in an area ranging from the rear side of the vehicle to the vehicle-width direction. Therefore, the antenna gain in directions 360 degrees around the vehicle 80 can be improved.

Also, the first element 51 and the second element 52 of the front antenna 111 are preferably arranged at an inclination (inclination angle β) equal to or less than ±15 degrees with respect to the vertical plane 91 perpendicular to the horizontal plane 90. Accordingly, the antenna gain in the direction parallel to the horizontal plane 90 is improved in the front antenna 111, and because the first element 51 and the second element 52 are arranged away from each other on both sides in the vehicle-width direction, the antenna gain in the vehicle-width direction is improved. This is also applicable to the inclination angle β of the first element 51 and the second element 52 of the rear antenna 112.

Also, the conductor plate 10 of the front antenna 111 is preferably arranged at an inclination (inclination angle γ) equal to or less than ±15 degrees with respect to the vertical plane 91 perpendicular to the horizontal plane 90. Accordingly, the antenna gain in the direction parallel to the horizontal plane 90 is improved in the front antenna 111, and because the first element 51 and the second element 52 are arranged away from each other on both sides in the vehicle-width direction, the antenna gain in the vehicle-width direction is improved. This is also applicable to the inclination angle γ of the conductor plate 10 of the rear antenna 112.

The conductor plate 10 of the front antenna 111 is preferably arranged at an inclination equal to or less than ±10 degrees, more preferably arranged at an inclination equal to or less than ±5 degrees, still more preferably arranged at an inclination equal to or less than ±1 degrees, and most preferably arranged at an inclination of 0 degrees, with respect to the vertical plane 91 perpendicular to the horizontal plane 90. Likewise, the conductor plate 10 of the rear antenna 112 is preferably arranged at an inclination equal to or less than ±10 degrees, more preferably arranged at an inclination equal to or less than ±5 degrees, still more preferably arranged at an inclination equal to or less than ±1 degrees, and most preferably arranged at an inclination of 0 degrees, with respect to the vertical plane perpendicular to the horizontal plane 90. If the conductor plate 10 of the front antenna 111 is arranged at an inclination more than ±15 degrees with respect to the vertical plane 91 perpendicular to the horizontal plane 90, the balance of the antenna gain in a direction parallel to the horizontal plane is lost, i.e., the difference between the gain in the traveling direction of the vehicle and the gain in the vehicle-width direction may increase. This is also applicable to the inclination angle γ of the conductor plate 10 of the rear antenna 112.

"X is arranged at 0 degrees with respect to the vertical plane 91" means that X is arranged in parallel with the vertical plane 91.

In the antenna system 100 as illustrated in FIG. 6, one vehicle antenna is attached to each of the windshield 71 and the rear window glass 72. However, the antenna system 100 may include: at least two window glasses from among the windshield 71, the rear window glass 72, and the side window glass 73; and at least one vehicle antenna attached to each of the at least two window glasses.

Figure 7:
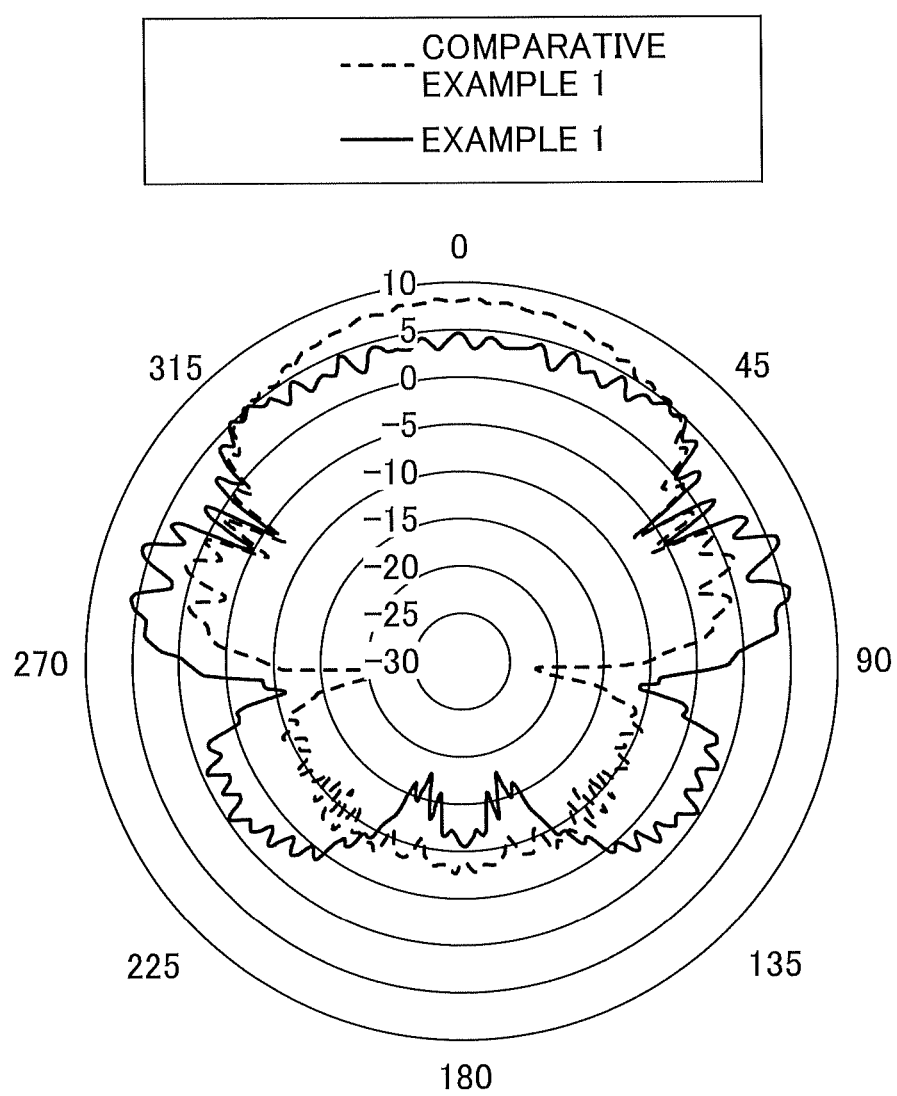
FIG. 7 is a diagram illustrating an example of a measurement result of directivity of a vehicle antenna.

FIG. 7 is a figure illustrating an example of a measurement result of directivities of the vehicle antennas, and illustrates a simulation result of antenna gains in respective azimuth directions on the ZX plane. "90 degrees" and "270 degrees" represent the vehicle-width direction. "0 degrees" represents the front side of the vehicle. "180 degrees" represents the rear side of the vehicle. This is also applicable to other graphs showing measurement results of directivities. It should be noted that this simulation result is a result obtained when the radiator plate, the elements, and the conductor plate of the vehicle antenna are arranged in the vertical direction perpendicular to the horizontal plane (at an inclination of 0 degrees with respect to the vertical plane). Unless otherwise specified, other simulation results are also results obtained with this arrangement.

In FIG. 7, Example 1 has the configuration illustrated in FIGS. 1 to 5 and 8. Comparative Example 1 has a configuration in which the first element 51 and the second element 52 are eliminated from the configuration of Example 1. In the case of Example 1, the antenna gain in the vehicle-width direction was calculated as −1.37 dBi, in the Comparative Example 1, the antenna gain in the vehicle-width direction was calculated as −9.85 dBi. Therefore, the antenna gain in the vehicle-width direction was improved in Example 1 as compared with Comparative Example 1.

When the antenna gains of FIG. 7 are measured, the sizes of respective portions illustrated in FIGS. 1 to 6 are as follows, in units of millimeters.

L20: 10
L21: 10
L50: 15
L51: 15
L52: 5
L53: 20
L54: 50
L55: 1
L56: 44
L57: 12
L58: 5
L60: 30
L61: 30
L62: 3
L63: 16 (distance between the conductor plate 10 and the flange of the vehicle 80)
L70: 500
L80: 515
L81: 1000
L82: 50

Also, the angles are as follows.
θ: 25 degrees
α, β, γ: 0 degrees

Figure 8:
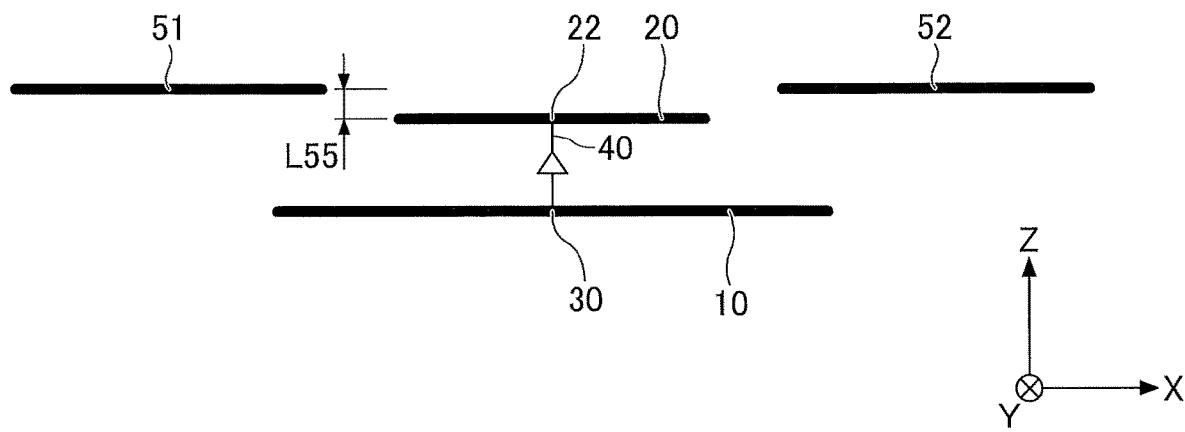
FIG. 8 is a drawing illustrating a first configuration example of a vehicle antenna.
Figure 9:
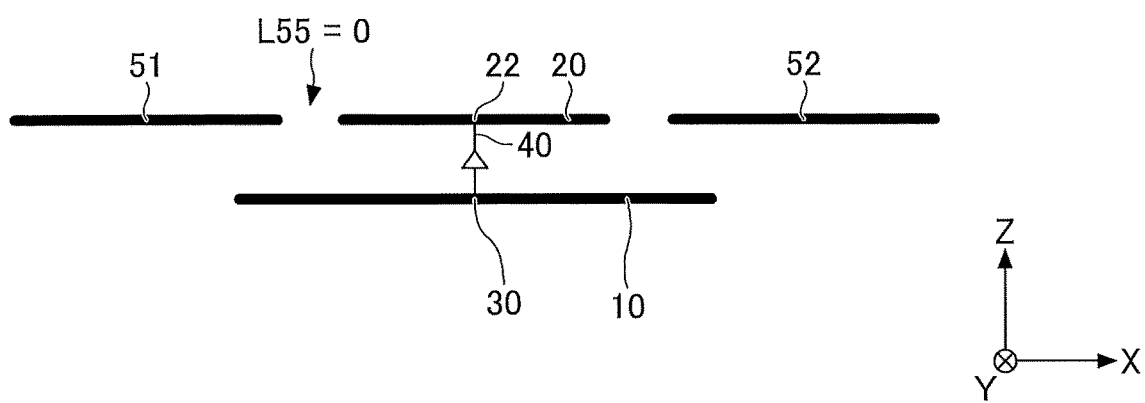
FIG. 9 is a drawing illustrating a second configuration example of a vehicle antenna.
Figure 10:
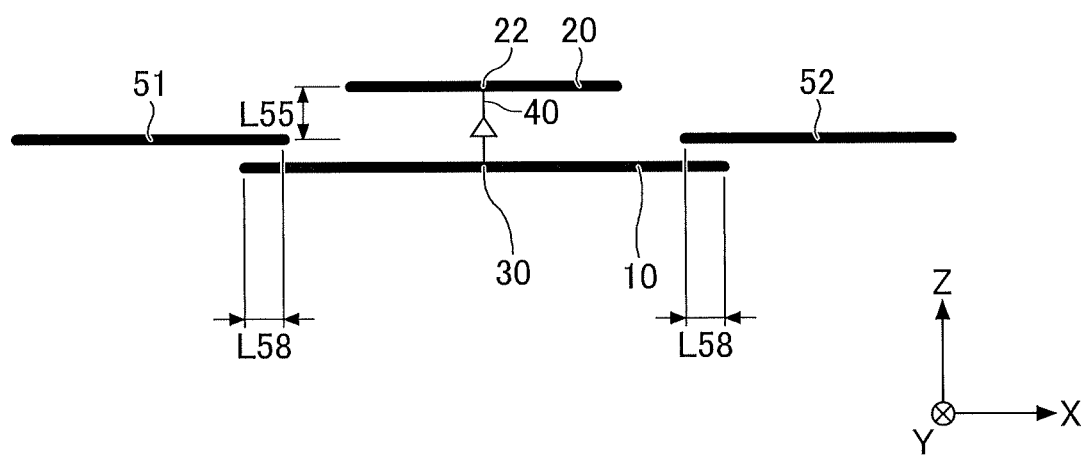
FIG. 10 is a drawing illustrating a third configuration example of a vehicle antenna.

FIGS. 8 to 10 are drawings illustrating first to third configuration examples of vehicle antennas, and illustrate modes in which the first element 51 and the second element 52 are arranged on a same side as the radiator plate 20 with respect to the conductor plate 10. FIGS. 8 to 10 illustrate modes in which the first element 51 and the second element 52 are arranged away from the radiator plate 20 and at least portions of the first element 51 and the second element 52 overlap with the conductor plate 10 as viewed from the same side as the radiator plate 20 with respect to the conductor plate 10. In FIG. 8, both of the first element 51 and the second element 52 are arranged on an opposite side of the radiator plate 20 from the conductor plate 10 (i.e., the positive side in the Z axis direction). In FIG. 9, both of the first element 51 and the second element 52 are arranged in the same layer as the radiator plate 20, i.e., the surface of the first element 51, the surface of the second element 52, and the surface of the radiator plate 20 are arranged in parallel with the XY plane. In FIG. 10, both of the first element 51 and the second element 52 are arranged on a same side as the conductor plate 10 with respect to the radiator plate 20 (i.e., the negative side in the Z axis direction).

Figure 11:
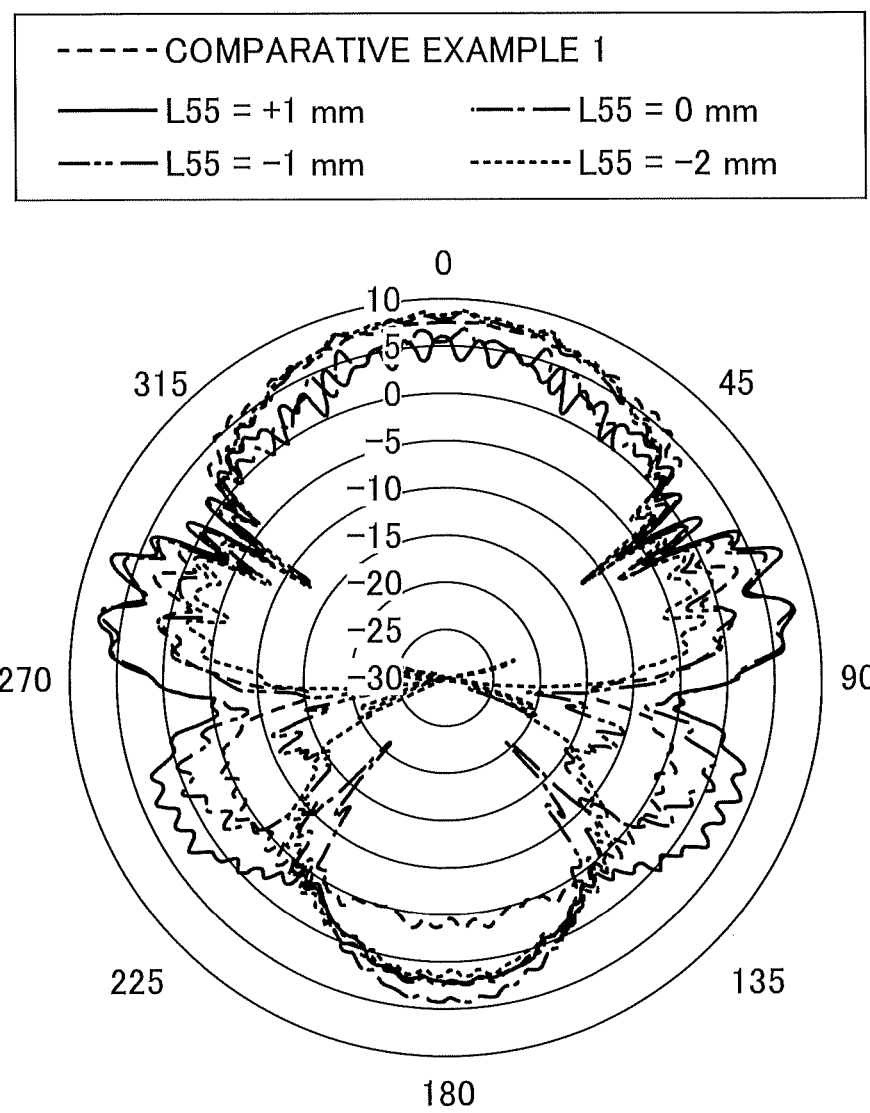
FIG. 11 is a diagram illustrating an example of a measurement result of directivities of vehicle antennas.

FIG. 11 is a figure illustrating an example of a measurement result of directivities of the vehicle antennas, and illustrates a simulation result of antenna gains in respective azimuth directions on the ZX plane. A case with L55=+1 mm corresponds to the configuration of FIG. 8 (Example 1). A case with L55=0 mm corresponds to the configuration of FIG. 9. Cases with L55=−1 mm and L55=−2 mm represent the configuration of FIG. 10. When the first element 51 and the second element 52 are located on the positive side in the Z axis direction with respect to the radiator plate 20, L55 had a positive value. When the first element 51 and the second element 52 are located on the negative side in the Z axis direction with respect to the radiator plate 20, L55 had a negative value. Unless otherwise specified, the sizes of the respective portions are the same as the sizes used in the measurement of FIG. 7.

Figure 12:
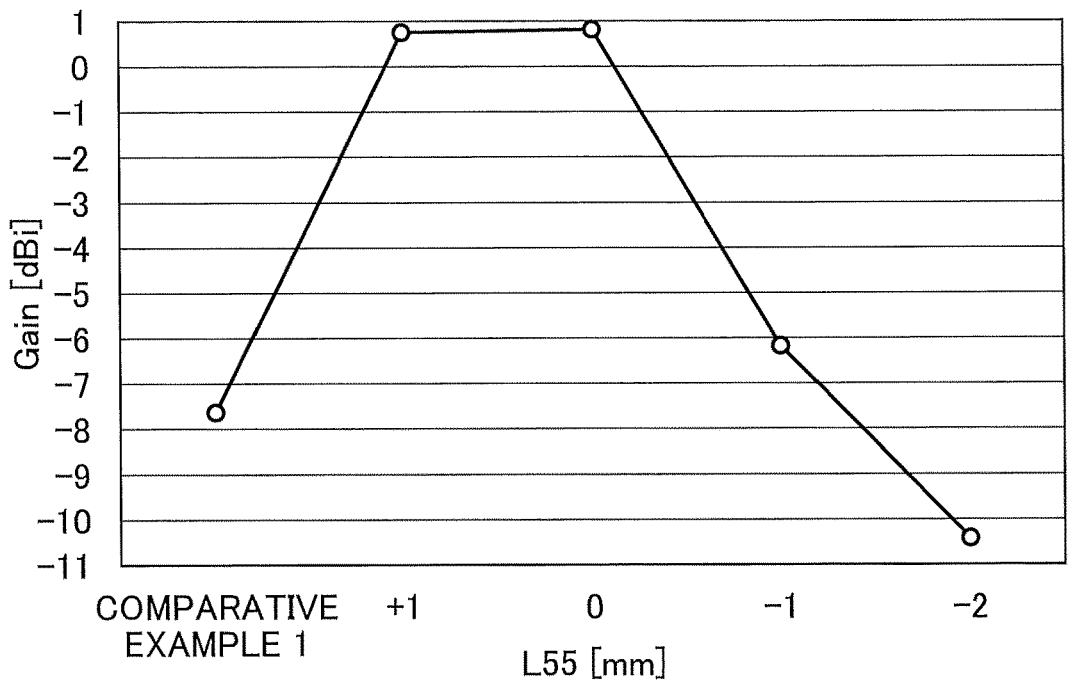
FIG. 12 is a drawing illustrating an example of a measurement result of antenna gains in a vehicle-width direction.

FIG. 12 illustrates the antenna gains in the vehicle-width direction with respect to the measurement result of FIG. 11. In a case where L55 was −1 mm, the antenna gain in the vehicle-width direction was improved as compared with Comparative Example 1. In a case where L55 was 0 mm and +1 mm, the antenna gains in the vehicle-width direction were further improved as compared with Comparative Example 1. In a case where L58 was +5 mm and L55 was −2 mm, the first element 51 and the second element 52 were closer to the conductor plate 10 and served as a larger conductor plate than Comparative Example 1, and therefore, the antenna gain in the vehicle-width direction decreased.

Figure 13:
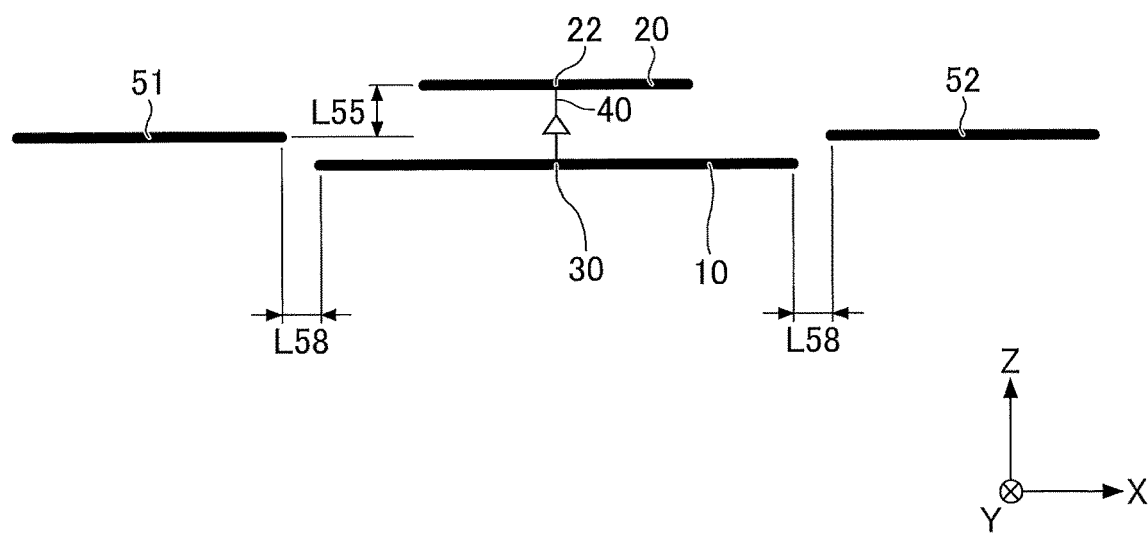
FIG. 13 is a drawing illustrating a fourth configuration example of a vehicle antenna.

FIG. 13 is a drawing illustrating a fourth configuration example of a vehicle antenna, and illustrates a mode in which the first element 51 and the second element 52 are separated away from each other in the X axis direction with respect to the third configuration example of FIG. 10. FIG. 13 illustrates a mode in which the first element 51 and the second element 52 are arranged away from the conductor plate 10 as viewed from the same side as the radiator plate 20 with respect to the conductor plate 10.

Figure 14:
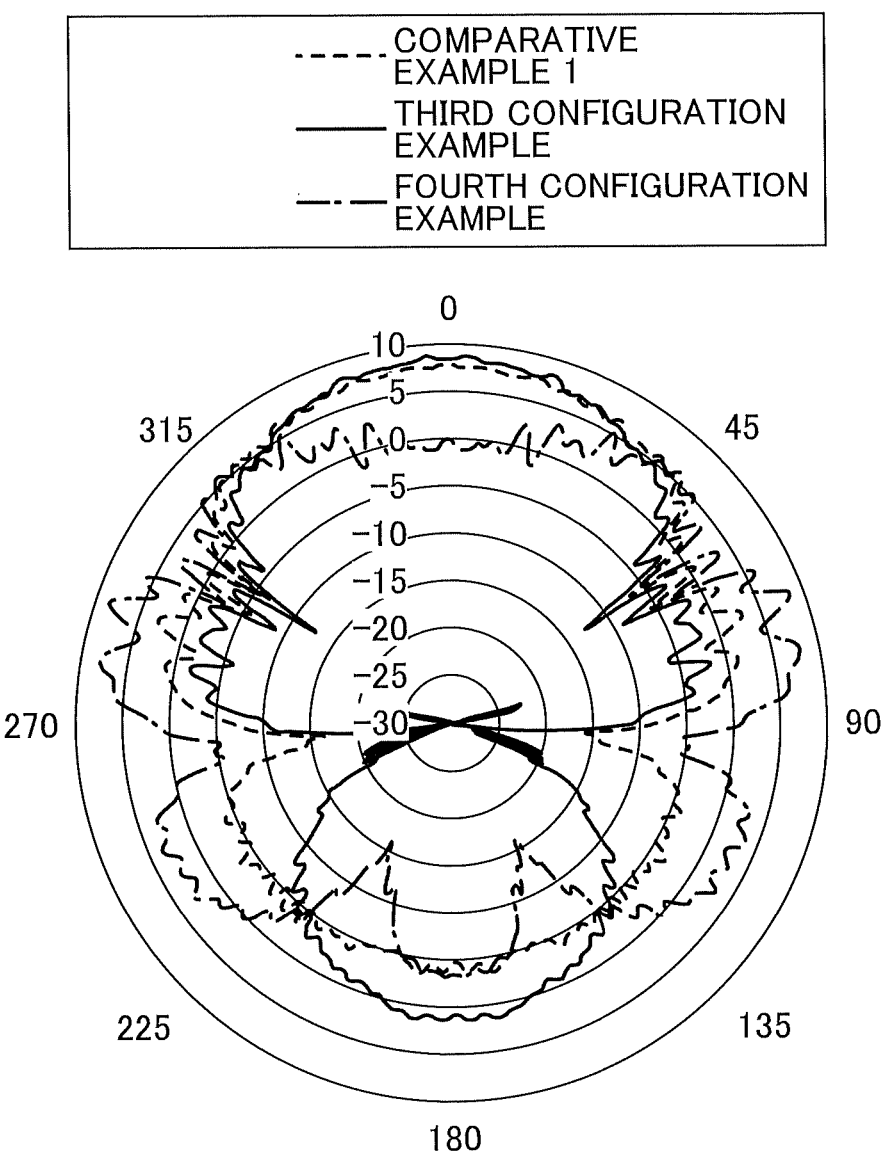
FIG. 14 is a diagram illustrating an example of a measurement result of directivities of vehicle antennas.

FIG. 14 illustrates a drawing illustrating an example of a measurement result of directivities of vehicle antennas, and illustrates a simulation result of antenna gains in respective azimuth directions on the ZX plane. In FIG. 14, the third configuration example (FIG. 10) is arranged with L55=−2 mm and L58=+5 mm. In FIG. 14, the fourth configuration example (FIG. 13) is arranged with L55=−2 mm and L58=−3 mm. When the first element 51 and the second element 52 overlapped the conductor plate 10 as seen from the viewpoint in the Z axis direction, L58 had a positive value. When the first element 51 and the second element 52 did not overlap the conductor plate 10, L58 had a negative value. Unless otherwise specified, the sizes of the respective portions are the same as the sizes used in the measurement of FIG. 7.

Figure 15:
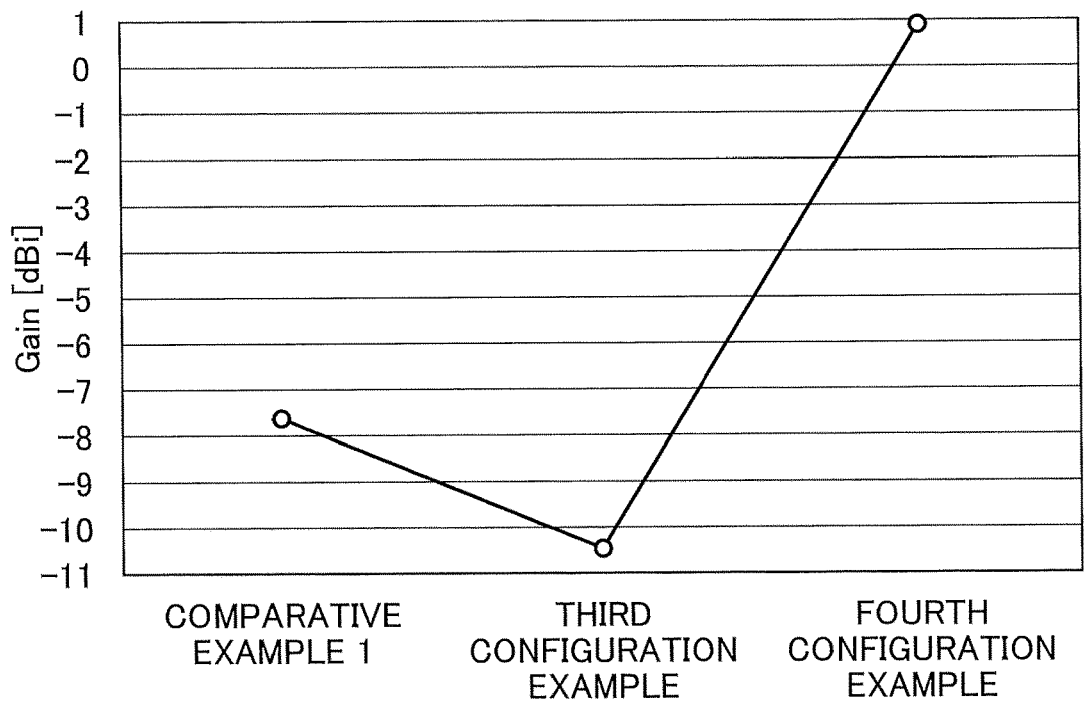
FIG. 15 is a drawing illustrating an example of a measurement result of antenna gains in the vehicle-width direction.

FIG. 15 illustrates the antenna gains in the vehicle-width direction with respect to the measurement result of FIG. 14. In the case of the fourth configuration example, the antenna gain in the vehicle-width direction was improved as compared with Comparative Example 1. In other words, when the positions of the first element 51 and the second element 52 were moved to the outside in the X axis direction with respect to the conductor plate 10, the antenna gain in the vehicle-width direction was improved, even when L55 was −2 mm, as compared with Comparative Example 1.

Figure 16:
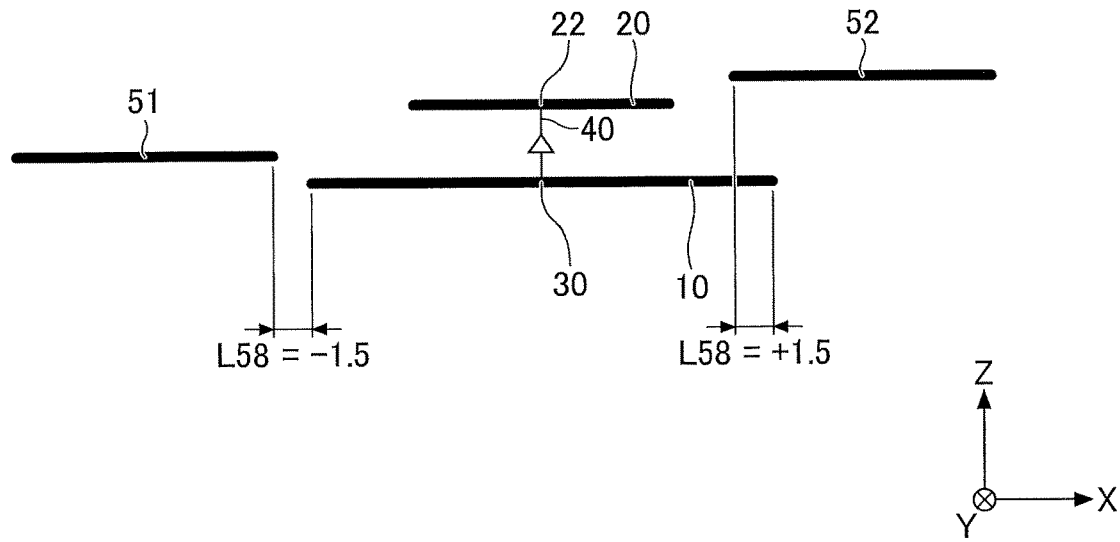
FIG. 16 is a drawing illustrating a fifth configuration example of a vehicle antenna.

FIG. 16 is a drawing illustrating a fifth configuration example of a vehicle antenna, and illustrates a mode in which the first element 51 is arranged on a same side as the conductor plate 10 with respect to the radiator plate 20, and the second element 52 is arranged on an opposite side of the radiator plate 20 from the conductor plate 10. In other words, FIG. 16 illustrates a mode in which the first element 51 and the second element 52 are staggered from each other with respect to the radiator plate 20. In FIG. 16, the first element 51 is arranged at the same position as FIG. 13 (L55=−2 mm), and the second element 52 is arranged at the same position as FIG. 8 (L55=+1 mm). The first element 51 is arranged with L58=−1.5 mm, and the second element 52 is arranged with L58=+1.5 mm.

Figure 17:
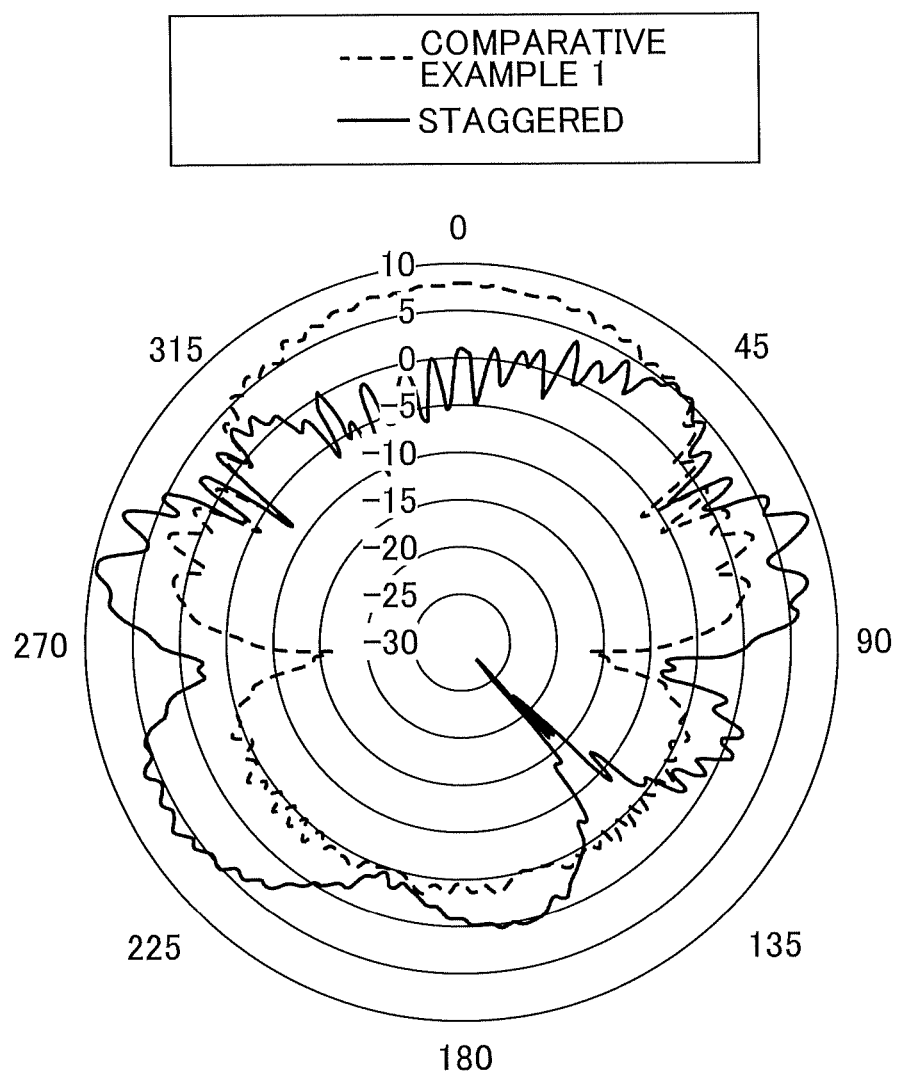
FIG. 17 is a diagram illustrating an example of a measurement result of directivities of vehicle antennas.

FIG. 17 is a drawing illustrating an example of a measurement result of directivities of vehicle antennas, and illustrates a simulation result of antenna gains in respective azimuth directions on the ZX plane. Unless otherwise specified, the sizes of the respective portions are the same as the sizes used in the measurement of FIG. 7. Even when the first element 51 and the second element 52 are staggered from each other with respect to the radiator plate 20, the antenna gain in the vehicle-width direction was improved. Specifically, the antenna gain in the direction of 90 degrees was 0.21 dBi, and the antenna gain in the direction of 270 degrees was 2.45 dBi.

Figure 18:
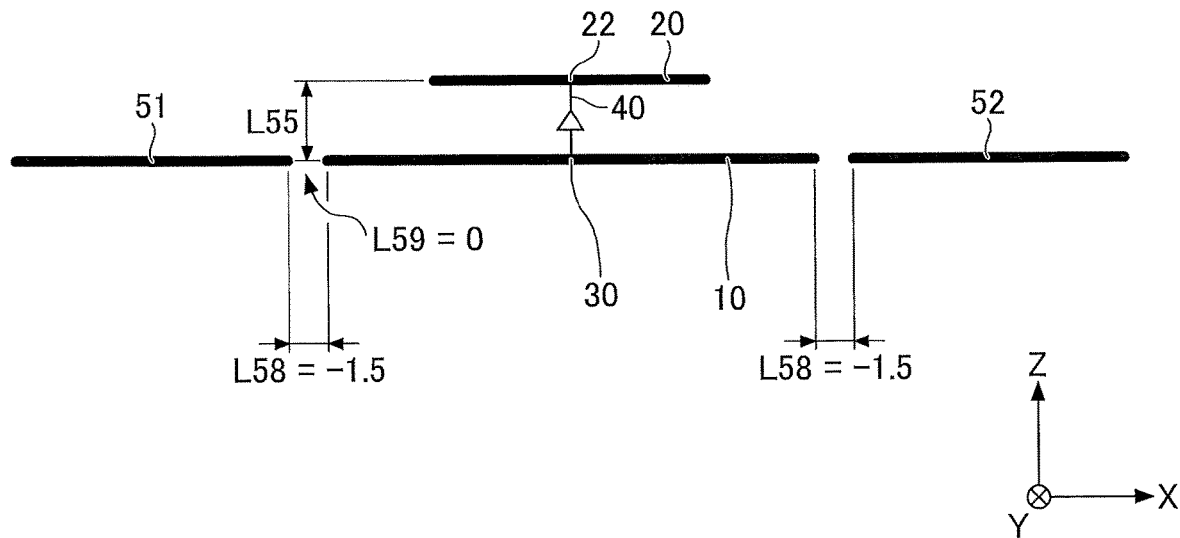
FIG. 18 is a drawing illustrating a sixth configuration example of a vehicle antenna.
Figure 19:
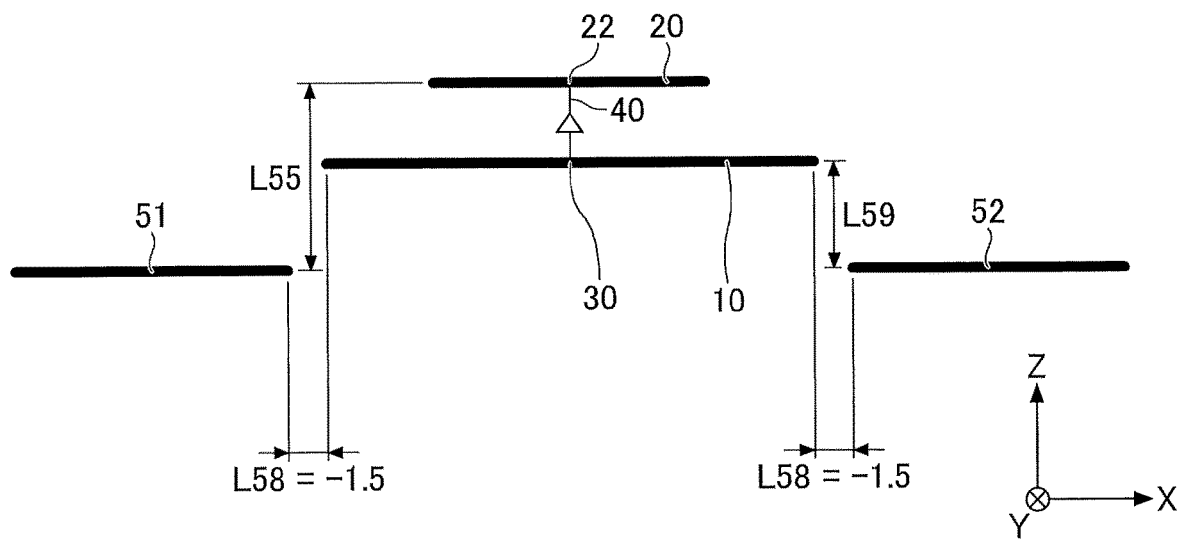
FIG. 19 is a drawing illustrating a seventh configuration example of a vehicle antenna.

FIG. 18 is a drawing illustrating a sixth configuration example of a vehicle antenna, and illustrates a mode in which both of the first element 51 and the second element 52 are arranged in the same layer as (i.e., coplanar with) the conductor plate 10. The first element 51 and the second element 52 are arranged with L58=−1.5 mm. FIG. 19 is a drawing illustrating a seventh configuration example of a vehicle antenna, and illustrates a mode in which both of the first element 51 and the second element 52 are arranged on an opposite side of the conductor plate 10 from the radiator plate 20. The first element 51 and the second element 52 are arranged with L58=−1.5 mm.

Figure 20:
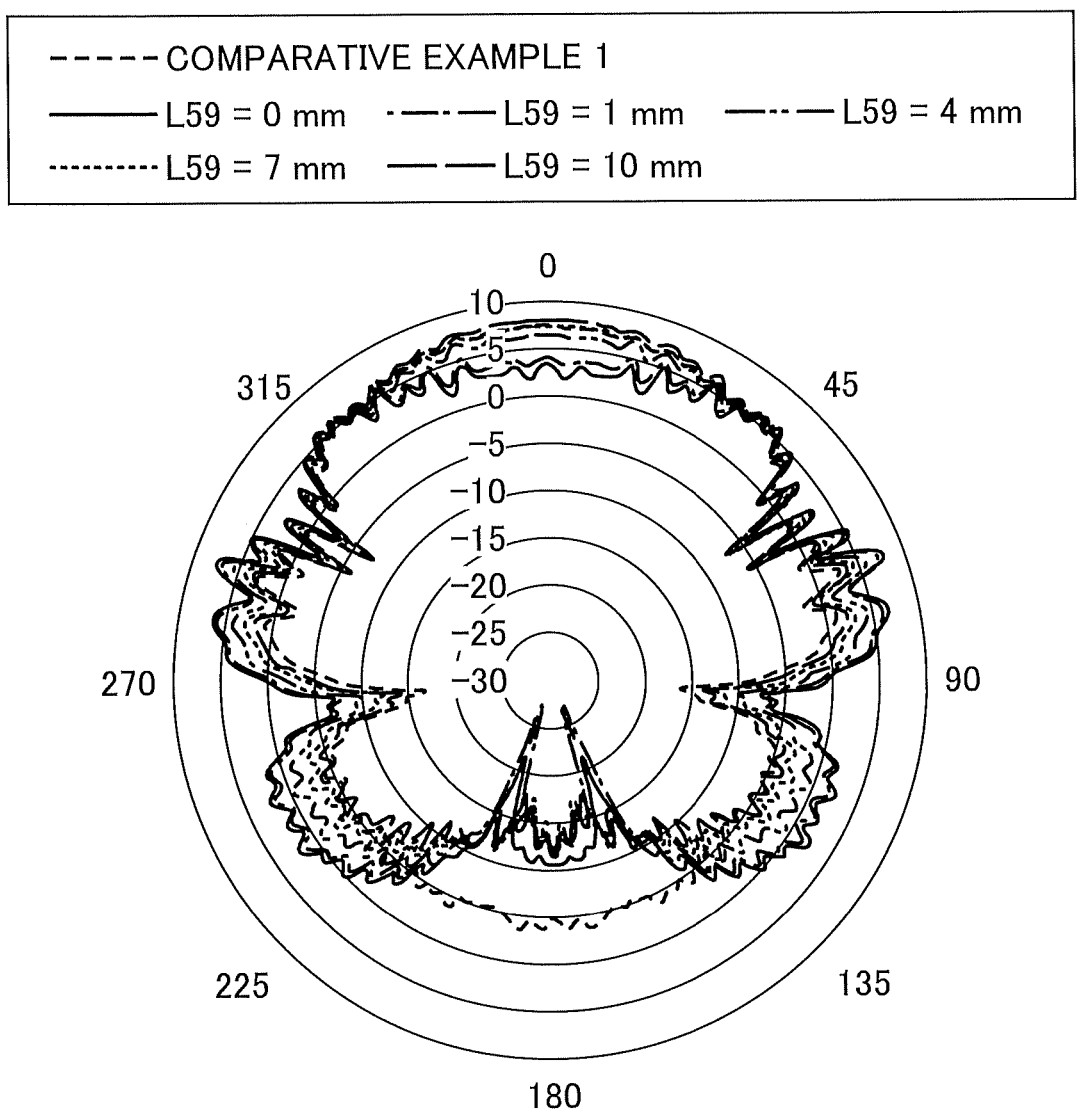
FIG. 20 is a diagram illustrating an example of a measurement result of directivities of vehicle antennas.

FIG. 20 is a drawing illustrating an example of a measurement result of directivities of vehicle antennas, and illustrates a simulation result of antenna gains in respective azimuth directions on the ZX plane. Unless otherwise specified, the sizes of the respective portions are the same as the sizes used in the measurement of FIG. 7. A case with L59=0 mm corresponds to the configuration of FIG. 18. Cases with L59=1 mm, 4 mm, 7 mm, 10 mm correspond to the configuration of FIG. 19. The distance L59 represents a distance in the Z axis direction from the conductor plate 10 to the first element 51 and the second element 52.

Figure 21:
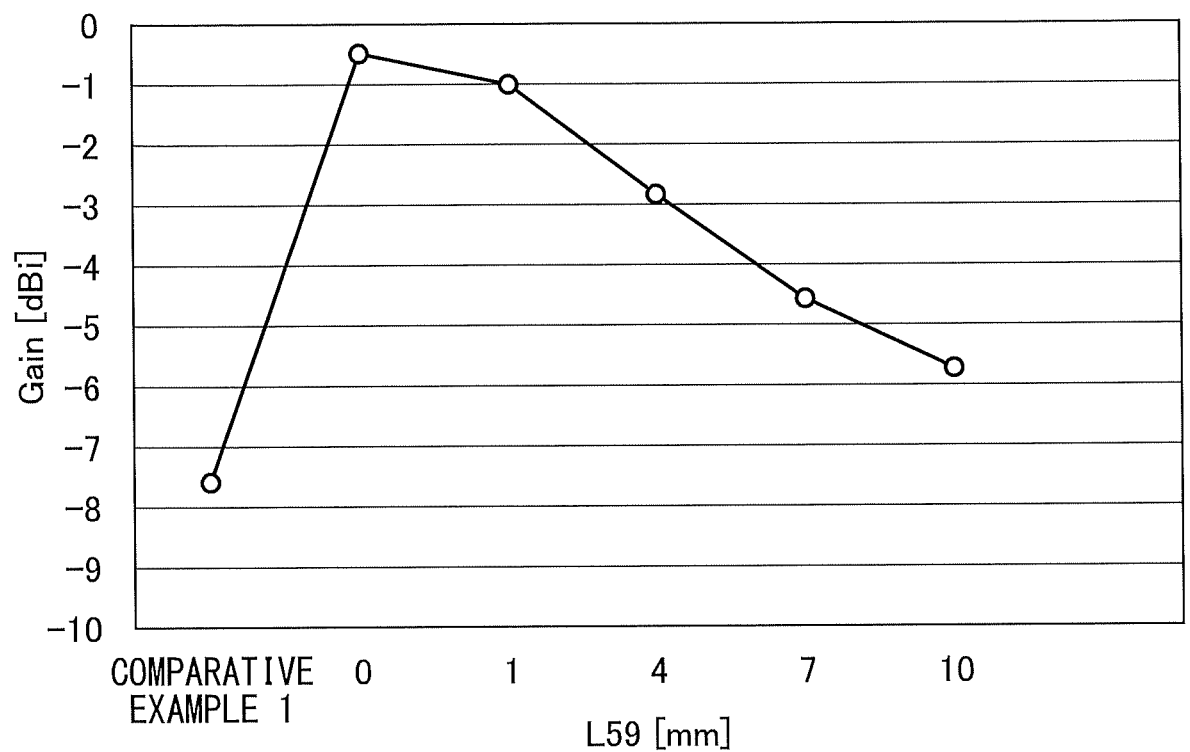
FIG. 21 is a drawing illustrating an example of a measurement result of antenna gains in the vehicle-width direction.

FIG. 21 illustrates the antenna gains in the vehicle-width direction with respect to the measurement result of FIG. 20. In any of the cases where L59 was 0 mm to 10 mm, the antenna gains in the vehicle-width direction were improved as compared with Comparative Example 1.

Figure 22:
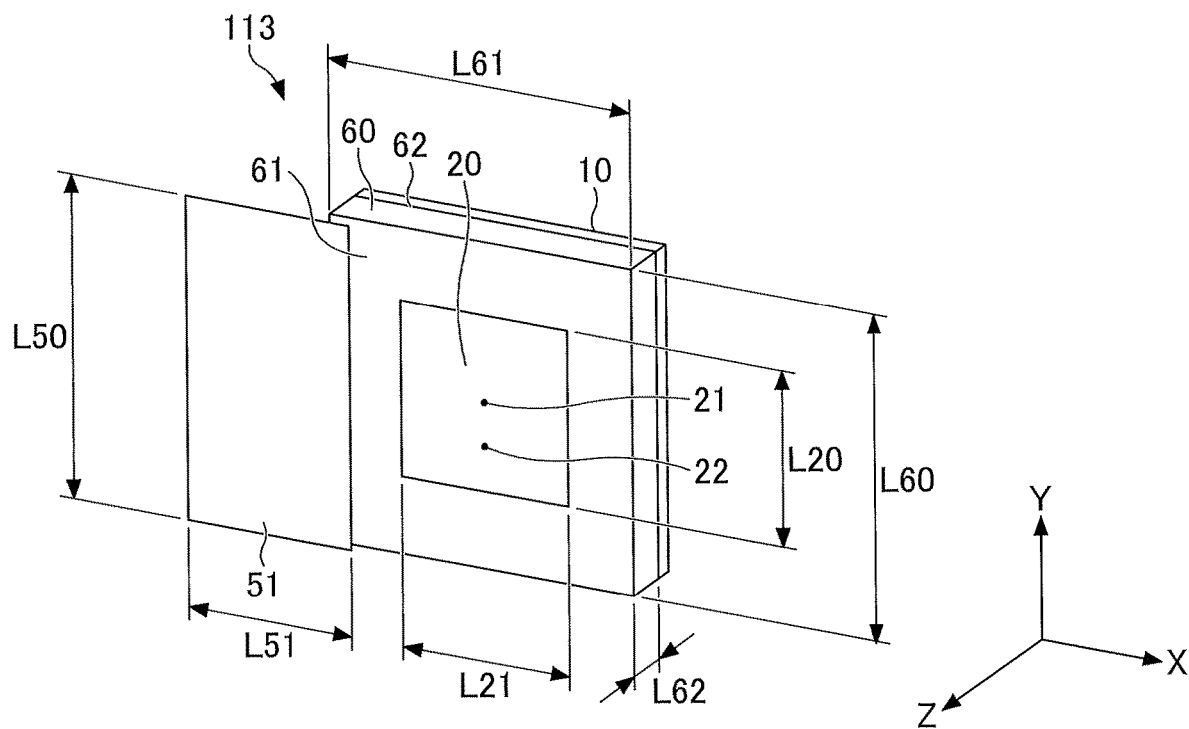
FIG. 22 is a drawing illustrating an eighth configuration example of a vehicle antenna.

FIG. 22 is a drawing illustrating an eighth configuration example of a vehicle antenna. An antenna 113 as illustrated in FIG. 22 is an example of a vehicle antenna. The antenna 113 includes a single element 51 arranged away from the conductor plate 10 and the radiator plate 20 and, as viewed from the same side as the radiator plate 20 with respect to the conductor plate 10, located away from the center of gravity 21 of the radiator plate 20. The element 51 is arranged only on the negative side in the vehicle-width direction with respect to the radiator plate 20, and as viewed from the same side as the radiator plate 20 with respect to the conductor plate 10, arranged away from the radiator plate 20. The element 51 is arranged on the same side as the radiator plate 20 with respect to the conductor plate 10. The radiator plate 20, the element 51, and the conductor plate 10 are arranged at an inclination of equal to or less than ±15 degrees with respect to the vertical plane perpendicular to the horizontal plane.

The single element 51 may be arranged in the same layer as the radiator plate 20 or the conductor plate 10, or may be arranged on an opposite side of the conductor plate 10 from the radiator plate 20.

Figure 23:
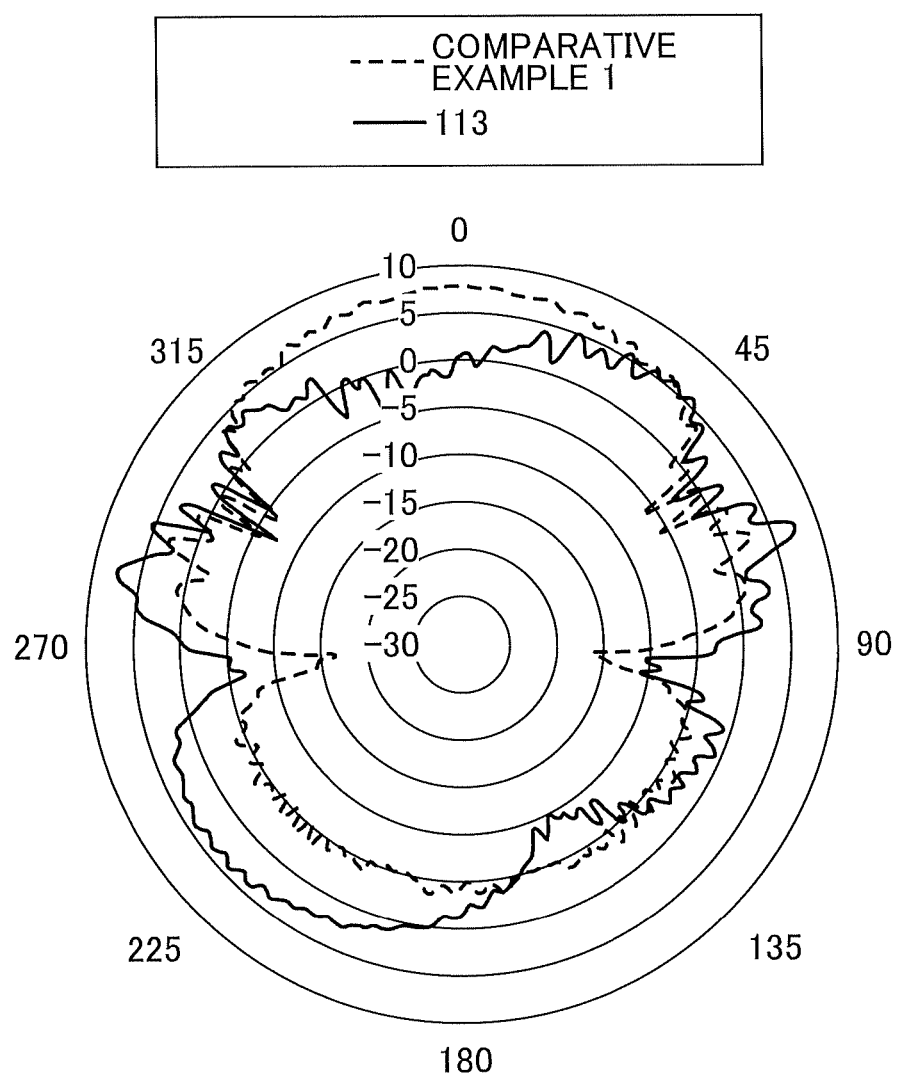
FIG. 23 is a diagram illustrating an example of a measurement result of directivities of vehicle antennas.

FIG. 23 is a drawing illustrating an example of a measurement result of directivities of vehicle antennas of FIG. 22, and illustrates a simulation result of antenna gains in respective azimuth directions on the ZX plan. The sizes of respective portions were as follows, in units of millimeters.
L50: 18
L51: 10
L58 (see FIG. 2): 1.5
L60: 18
L61: 18

Unless otherwise specified, the sizes of the other portions are the same as the sizes used in the measurement of FIG. 7. As illustrated in FIG. 23, even with the single element 51, the antenna gain in the vehicle-width direction was improved, and in particular, the antenna gain was improved on the side where the element 51 was arranged (the negative side in the X axis direction).

Figure 24:
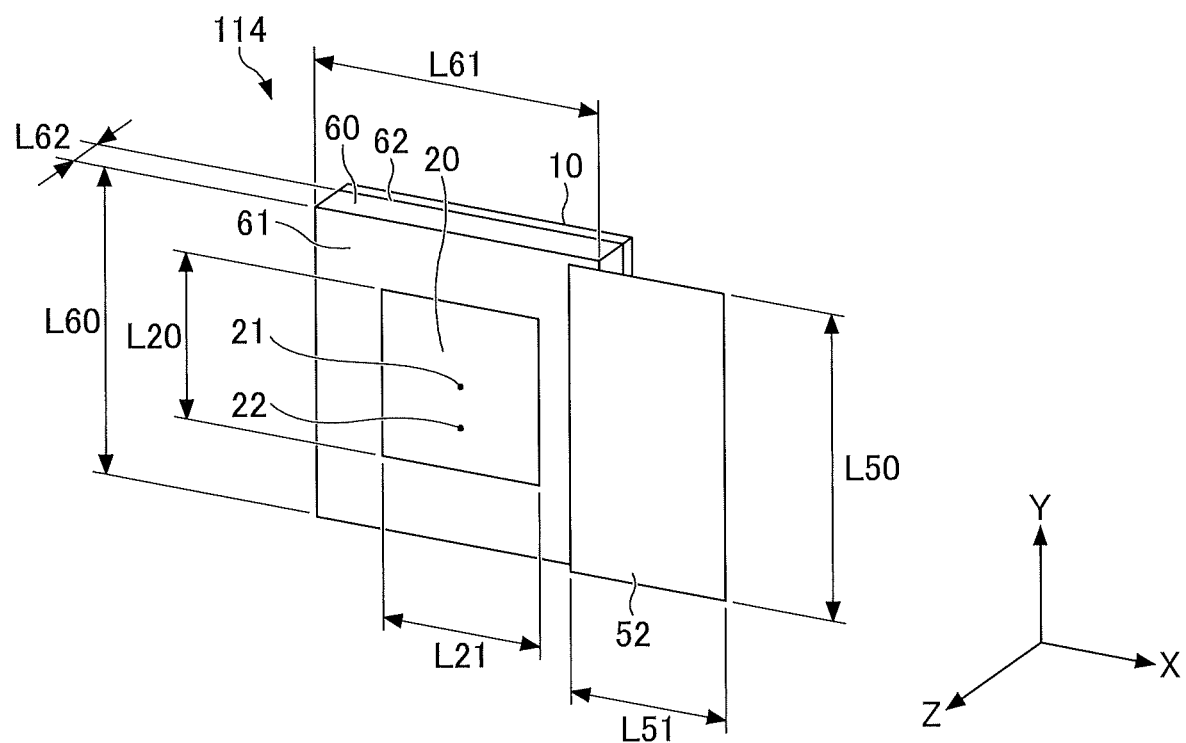
FIG. 24 is a drawing illustrating a ninth configuration example of a vehicle antenna.

FIG. 24 is a drawing illustrating a ninth configuration example of a vehicle antenna. The antenna 114 as illustrated in FIG. 24 is an example of a vehicle antenna. The antenna 114 includes a single element 52 arranged away from the conductor plate 10 and the radiator plate 20 and, as viewed from the same side as the radiator plate 20 with respect to the conductor plate 10, located away from the center of gravity 21 of the radiator plate 20. The element 52 is arranged only on the positive side in the vehicle-width direction with respect to the radiator plate 20, and as viewed from the same side as the radiator plate 20 with respect to the conductor plate 10, arranged away from the radiator plate 20. The element 52 is arranged on the same side as the radiator plate 20 with respect to the conductor plate 10. The radiator plate 20, the element 52, and the conductor plate 10 are arranged at an inclination of equal to or less than ±15 degrees with respect to the vertical plane perpendicular to the horizontal plane.

The single element 52 may be arranged in the same layer as the radiator plate 20 or the conductor plate 10, or may be arranged on an opposite side of the conductor plate 10 from the radiator plate 20.

Figure 25:
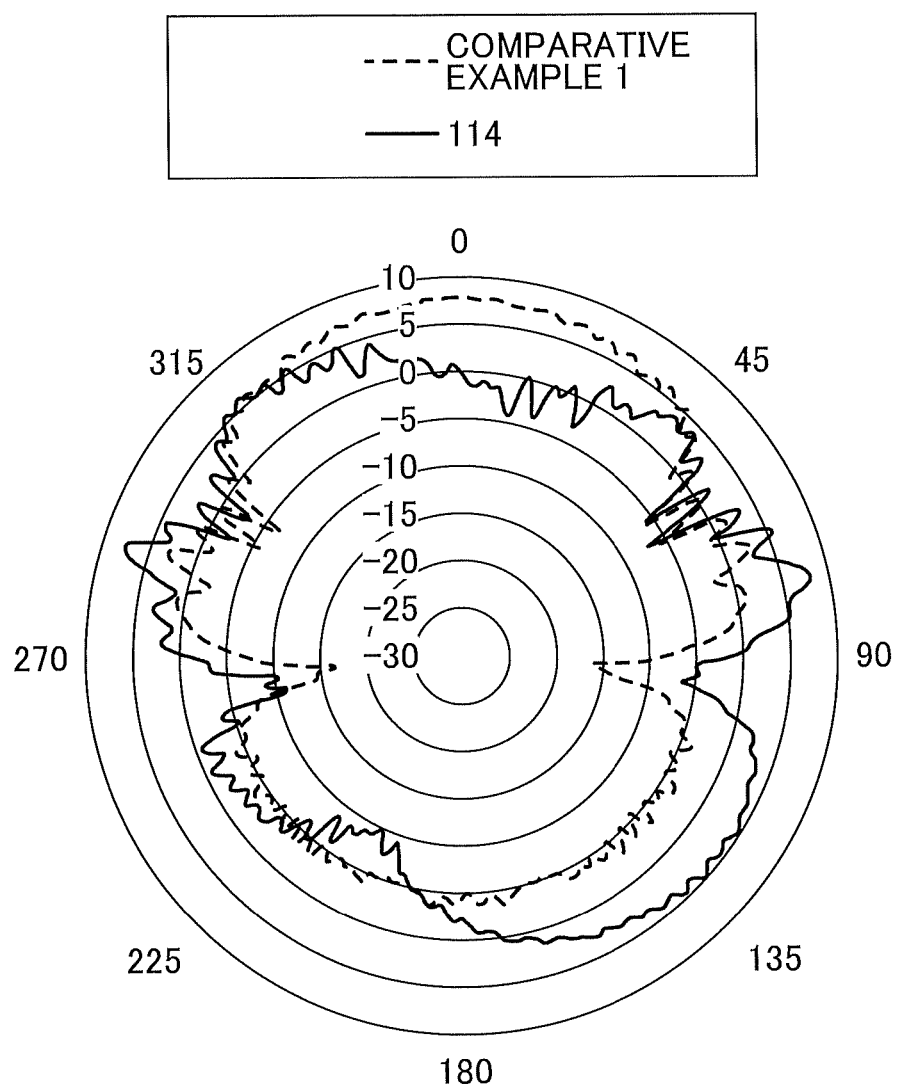
FIG. 25 is a diagram illustrating an example of a measurement result of directivities of vehicle antennas.

FIG. 25 is a drawing illustrating an example of a measurement result of directivities of vehicle antennas of FIG. 24, and illustrates a simulation result of antenna gains in respective azimuth directions on the ZX plane. The sizes of respective portions are as follows, in units of millimeters.
L50: 18
L51: 10
L58 (see FIG. 2): 1.5
L60: 18
L61: 18

Unless otherwise specified, the sizes of the other portions are the same as the sizes used in the measurement of FIG. 7. As illustrated in FIG. 25, even with the single element 52, the antenna gain in the vehicle-width direction was improved, and in particular, the antenna gain was improved on the side where the element 52 is arranged (the positive side in the X axis direction).

In the above simulation result, the ratio A:B was obtained as follows. In particular, in Comparative Example 1, the ratio A:B defined above was 1:0.52. In contrast, with respect to the ratio A:B of the antennas other than Comparative Example 1 (i.e., the antenna 110 including the element 51 and the element 52, and the antennas 113, 114 including the single element), a simulation result was obtained in which a ratio in the vehicle-width direction to the traveling direction is relatively high as compared with Comparative Example 1, and the balance of the antenna directivity was good.

TABLE 1

| Items | A: Traveling Direction - (−35) [dBi] | B: Vehicle-width direction - (−35) [dBi] | A:B |
|---|---|---|---|
| Comparative Example 1 (FIG. 7) | 42.9 | 22.2 | 1:0.52 |
| Example 1 (FIG. 7) | 39.5 | 33.6 | 1:0.85 |
| L55 = +1 mm (FIG. 11) | 41.0 | 35.8 | 1:0.87 |
| L55 = 0 mm (FIG. 11) | 40.2 | 35.8 | 1:0.89 |
| L55 = −1 mm (FIG. 11) | 42.9 | 28.9 | 1:0.67 |
| L55 = −2 mm (FIG. 11) | 43.3 | 24.6 | 1:0.57 |
| Third Configuration Example (FIG. 14) | 43.3 | 24.6 | 1:0.57 |
| Fourth Configuration Example (FIG. 14) | 34.8 | 36.0 | 1:1.03 |
| Staggered (FIG. 17) | 35.7 | 36.3 | 1:1.02 |
| L59 = 0 mm (FIG. 20) | 38.5 | 34.5 | 1:0.90 |
| L59 = 1 mm (FIG. 20) | 39.2 | 34.0 | 1:0.87 |
| L59 = 4 mm (FIG. 20) | 41.6 | 32.1 | 1:0.77 |
| L59 = 7 mm (FIG. 20) | 42.7 | 30.4 | 1:0.71 |
| L59 = 10 mm (FIG. 20) | 43.2 | 29.3 | 1:0.68 |
| Antenna 113 (FIG. 23) | 35.4 | 33.3 | 1:0.94 |
| Antenna 114 (FIG. 25) | 35.4 | 34.5 | 1:0.97 |

Hereinabove, the vehicle antenna, the vehicle antenna-attached window glass, and the antenna system have been explained with reference to the embodiment, but the present invention is not limited to the above embodiment. Various modifications and improvements such as combinations, replacements, and the like with a part or the entirety of another embodiment can be made within the scope of the present invention.

For example, the present invention is not limited to the case where both of the first element 51 and the second element 52 are arranged in the same layer as the radiator plate 20 (see FIG. 9), and at least one of the first element 51 and the second element 52 may be arranged in the same layer as the radiator plate 20.

For example, the present invention is not limited to the case where both of the first element 51 and the second element 52 are arranged on an opposite side of the conductor plate 10 from the radiator plate 20 (see FIG. 19), and at least one of the first element 51 and the second element 52 may be arranged on the side opposite the radiator plate 20.

The present invention is not limited to the case where parts of both of the first element 51 and the second element 52 overlap the conductor plate 10 as viewed from the same side as the radiator plate 20 with respect to the conductor plate 10 (see FIG. 8 and the like). For example, a part of one of the first element 51 and the second element 52 may overlap the conductor plate 10 as seen from this viewpoint.

What is claimed is:

1. A vehicle antenna comprising:
   a conductor plate;
   a radiator plate facing the conductor plate;
   a feeding portion located on a same side as the conductor plate with respect to the radiator plate;
   a connection conductor connecting the feeding portion and the radiator plate; and
   a first element and a second element arranged away from each other on both sides in a vehicle-width direction of a vehicle with respect to the radiator plate,
   wherein the radiator plate is arranged at an inclination of equal to or less than ±15 degrees with respect to a vertical plane perpendicular to a horizontal plane, and
   wherein at least one of the first element and the second element is arranged in a same layer as the conductor plate.

2. The vehicle antenna according to claim 1, wherein the first element and the second element are arranged in a same plane as each other.

3. The vehicle antenna according to claim 1, wherein a portion of at least one of the first element and the second element overlaps the conductor plate, as viewed from a same side as the radiator plate with respect to the conductor plate.

4. The vehicle antenna according to claim 1, wherein the first element, the second element, the conductor plate, and the radiator plate are parallel to each other.

5. The vehicle antenna according to claim 1, wherein the first element and the second element are located away from a center of gravity of the radiator plate, as viewed from a same side as the radiator plate with respect to the conductor plate.

6. The vehicle antenna according to claim 1, wherein the first element and the second element are located away from the radiator plate, as viewed from a same side as the radiator plate with respect to the conductor plate.

7. The vehicle antenna according to claim 1, wherein, as viewed from a same side as the radiator plate with respect to the conductor plate, the first element and the second element are linearly symmetrical about an axis of symmetry passing through a connection point where the connection conductor is connected to the radiator plate.

8. The vehicle antenna according to claim 1, wherein the first element and the second element are arranged at an inclination of equal to or less than ±15 degrees with respect to the vertical plane perpendicular to the horizontal plane.

9. The vehicle antenna according to claim 1, wherein the vehicle antenna is configured to transmit and receive an electromagnetic wave in 5.9 GHz band.

10. A vehicle antenna-attached window glass comprising:
    a glass plate for a window of a vehicle; and
    at least one vehicle antenna according to claim 1 attached to the glass plate.

11. An antenna system comprising:
    at least two window glasses selected from among a windshield, a rear window glass, and a side window glass of a vehicle; and
    at least one vehicle antenna according to claim 1 attached to each of the at least two window glasses.

12. The vehicle antenna according to claim 1, wherein where a value obtained by subtracting −35 [dBi] from an antenna gain [dBi] in a traveling direction of the vehicle is defined as A [dBi], and a value obtained by subtracting −35 [dBi] from an antenna gain [dBi] in a vehicle-width direction of the vehicle is defined as B [dBi], a ratio A:B is in a range of 1:0.55 to 1:1.50.

13. A vehicle antenna comprising:
    a conductor plate;
    a radiator plate facing the conductor plate;
    a feeding portion located on a same side as the conductor plate with respect to the radiator plate;
    a connection conductor connecting the feeding portion and the radiator plate; and
    a first element and a second element arranged away from each other on both sides in a vehicle-width direction of a vehicle with respect to the radiator plate, wherein the radiator plate is arranged at an inclination of equal to or less than ±15 degrees with respect to a vertical plane perpendicular to a horizontal plane, and wherein the first element and the second element do not overlap with the conductor plate, as viewed from a same side as the radiator plate with respect to the conductor plate.

14. The vehicle antenna according to claim 13, wherein the first element and the second element are arranged on a same side as the radiator plate with respect to the conductor plate.

15. The vehicle antenna according to claim 14, wherein at least one of the first element and the second element is arranged on an opposite side of the radiator plate from the conductor plate.

16. The vehicle antenna according to claim 14, wherein at least one of the first element and the second element is arranged in a same plane as the radiator plate.

17. The vehicle antenna according to claim 13, wherein at least one of the first element and the second element is arranged on an opposite side of the conductor plate from the radiator plate.

18. The vehicle antenna according to claim 13, wherein the first element and the second element are arranged in a same plane as each other.

19. The vehicle antenna according to claim 13, wherein a portion of at least one of the first element and the second element overlaps the conductor plate, as viewed from a same side as the radiator plate with respect to the conductor plate.

20. The vehicle antenna according to claim 13, wherein the first element, the second element, the conductor plate, and the radiator plate are parallel to each other.

21. The vehicle antenna according to claim 13, wherein the first element and the second element are located away from a center of gravity of the radiator plate, as viewed from a same side as the radiator plate with respect to the conductor plate.

22. The vehicle antenna according to claim 13, wherein the first element and the second element are located away from the radiator plate, as viewed from a same side as the radiator plate with respect to the conductor plate.

23. The vehicle antenna according to claim 13, wherein, as viewed from a same side as the radiator plate with respect to the conductor plate, the first element and the second element are linearly symmetrical about an axis of symmetry passing through a connection point where the connection conductor is connected to the radiator plate.

24. The vehicle antenna according to claim 13, wherein the first element and the second element are arranged at an inclination of equal to or less than ±15 degrees with respect to the vertical plane perpendicular to the horizontal plane.

25. The vehicle antenna according to claim 13, wherein the vehicle antenna is configured to transmit and receive an electromagnetic wave in 5.9 GHz band.

26. A vehicle antenna-attached window glass comprising:
a glass plate for a window of a vehicle; and
at least one vehicle antenna according to claim 13 attached to the glass plate.

27. An antenna system comprising:
at least two window glasses selected from among a windshield, a rear window glass, and a side window glass of a vehicle; and
at least one vehicle antenna according to claim 13 attached to each of the at least two window glasses.

28. The vehicle antenna according to claim 13, wherein where a value obtained by subtracting −35 [dBi] from an antenna gain [dBi] in a traveling direction of the vehicle is defined as A [dBi], and a value obtained by subtracting −35 [dBi] from an antenna gain [dBi] in a vehicle-width direction of the vehicle is defined as B [dBi], a ratio A:B is in a range of 1:0.55 to 1:1.50.

29. A vehicle antenna comprising:
a conductor plate;
a radiator plate facing the conductor plate;
a feeding portion located on a same side as the conductor plate with respect to the radiator plate;
a connection conductor connecting the feeding portion and the radiator plate; and
a first element and a second element arranged away from each other on both sides in a vehicle-width direction of a vehicle with respect to the radiator plate,
wherein the radiator plate is arranged at an inclination of equal to or less than ±15 degrees with respect to a vertical plane perpendicular to a horizontal plane, and
wherein a value obtained by subtracting −35 [dBi] from an antenna gain [dBi] in a traveling direction of the vehicle is defined as A [dBi], and a value obtained by subtracting −35 [dBi] from an antenna gain [dBi] in a vehicle-width direction of the vehicle is defined as B [dBi], a ratio A:B is in a range of 1:0.55 to 1:1.50.

30. The vehicle antenna according to claim 29, wherein the first element and the second element are arranged on a same side as the radiator plate with respect to the conductor plate.

31. The vehicle antenna according to claim 30, wherein at least one of the first element and the second element is arranged on an opposite side of the radiator plate from the conductor plate.

32. The vehicle antenna according to claim 30, wherein at least one of the first element and the second element is arranged in a same plane as the radiator plate.

33. The vehicle antenna according to claim 29, wherein at least one of the first element and the second element is arranged on an opposite side of the conductor plate from the radiator plate.

34. The vehicle antenna according to claim 29, wherein the first element and the second element are arranged in a same plane as each other.

35. The vehicle antenna according to claim 29, wherein a portion of at least one of the first element and the second element overlaps the conductor plate, as viewed from a same side as the radiator plate with respect to the conductor plate.

36. The vehicle antenna according to claim 29, wherein the first element, the second element, the conductor plate, and the radiator plate are parallel to each other.

37. The vehicle antenna according to claim 29, wherein the first element and the second element are located away from a center of gravity of the radiator plate, as viewed from a same side as the radiator plate with respect to the conductor plate.

38. The vehicle antenna according to claim 29, wherein the first element and the second element are located away from the radiator plate, as viewed from a same side as the radiator plate with respect to the conductor plate.

39. The vehicle antenna according to claim 29, wherein, as viewed from a same side as the radiator plate with respect to the conductor plate, the first element and the second element are linearly symmetrical about an axis of symmetry passing through a connection point where the connection conductor is connected to the radiator plate.

40. The vehicle antenna according to claim 29, wherein the first element and the second element are arranged at an inclination of equal to or less than ±15 degrees with respect to the vertical plane perpendicular to the horizontal plane.

41. The vehicle antenna according to claim 29, wherein the vehicle antenna is configured to transmit and receive an electromagnetic wave in 5.9 GHz band.

42. A vehicle antenna-attached window glass comprising:
- a glass plate for a window of a vehicle; and
- at least one vehicle antenna according to claim 29 attached to the glass plate.

43. An antenna system comprising:
- at least two window glasses selected from among a windshield, a rear window glass, and a side window glass of a vehicle; and
- at least one vehicle antenna according to claim 29 attached to each of the at least two window glasses.

* * * * *